US011445018B2

(12) United States Patent
Zana et al.

(10) Patent No.: US 11,445,018 B2
(45) Date of Patent: Sep. 13, 2022

(54) TECHNOLOGIES FOR SYNCHRONIZING CONTENT ITEMS ACROSS CONTENT MANAGEMENT SYSTEMS

(71) Applicant: Dropbox, inc., San Francisco, CA (US)

(72) Inventors: Joshua Zana, Seattle, WA (US); Tristan Pendergrass, Seattle, WA (US); Andrew Lawson, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 124 days.

(21) Appl. No.: 16/712,438

(22) Filed: Dec. 12, 2019

(65) Prior Publication Data
US 2021/0185120 A1 Jun. 17, 2021

(51) Int. Cl.
*H04L 67/1095* (2022.01)
*H04L 9/40* (2022.01)
*H04L 67/1097* (2022.01)
*G06F 16/178* (2019.01)
*H04L 67/53* (2022.01)

(52) U.S. Cl.
CPC ........ *H04L 67/1095* (2013.01); *G06F 16/178* (2019.01); *H04L 63/08* (2013.01); *H04L 67/1097* (2013.01); *H04L 67/53* (2022.05)

(58) Field of Classification Search
CPC . H04L 67/1095; H04L 63/08; H04L 67/1097; H04L 67/20; G06F 16/178
See application file for complete search history.

(56) References Cited

U.S. PATENT DOCUMENTS

| | | | |
|---|---|---|---|
| 8,515,907 B2 | 8/2013 | Burjoski | |
| 8,825,597 B1 | 9/2014 | Houston et al. | |
| 9,071,606 B2 | 6/2015 | Braun et al. | |
| 9,426,216 B2 | 8/2016 | Subramani et al. | |
| 9,432,457 B2 | 8/2016 | Marano et al. | |
| 9,501,484 B2 | 11/2016 | Von Haden et al. | |
| 9,614,933 B2 | 4/2017 | Jwalanna | |
| 9,659,184 B2 | 5/2017 | Odnovorov et al. | |
| 9,715,534 B2 | 7/2017 | Beausoleil et al. | |
| 9,807,135 B1 | 10/2017 | Hansen et al. | |

(Continued)

*Primary Examiner* — Ninos Donabed
*Assistant Examiner* — Raqiul A Choudhury
(74) *Attorney, Agent, or Firm* — Polsinelli PC

(57) ABSTRACT

Technologies for synchronizing content items across cloud systems are provided. An example method can include receiving, by a first content management system (CMS), authentication information associated with a second CMS; based on the authentication information, establishing a communication channel between the first CMS and second CMS; using the communication channel, providing a user interface identifying collections of content items stored on the second CMS; receiving, by the first CMS, a request to create a first collection of content items based on a second collection of content items selected by a user account from the user interface, the second collection being stored on the second CMS; creating, by the first CMS, the first collection in association with the user account; populating the first collection with placeholders corresponding to content items in the second collection; and upon detecting a change to the second collection, updating the first collection to reflect the change.

20 Claims, 11 Drawing Sheets

(56) References Cited

U.S. PATENT DOCUMENTS

| | | | |
|---|---|---|---|
| 2013/0275509 A1* | 10/2013 | Micucci | H04L 67/26 |
| | | | 709/204 |
| 2014/0201137 A1* | 7/2014 | Vibhor | G06F 16/275 |
| | | | 707/610 |
| 2014/0222917 A1 | 8/2014 | Poirier et al. | |
| 2014/0304326 A1* | 10/2014 | Wesley | H04L 67/10 |
| | | | 709/203 |
| 2014/0324776 A1* | 10/2014 | Novak | G06F 16/1744 |
| | | | 707/624 |
| 2014/0359505 A1* | 12/2014 | Cisler | G06F 16/144 |
| | | | 715/769 |
| 2016/0140139 A1 | 5/2016 | Torres et al. | |
| 2017/0046531 A1 | 2/2017 | Roberts | |
| 2018/0129950 A1* | 5/2018 | Kumar | G06N 20/00 |
| 2018/0246905 A1 | 8/2018 | Besen et al. | |

\* cited by examiner

TECHNOLOGIES FOR SYNCHRONIZING CONTENT ITEMS ACROSS CONTENT MANAGEMENT SYSTEMS

TECHNICAL FIELD

The present technology pertains to storing and synchronizing collections and folders across different content management systems.

BACKGROUND

Cloud storage systems allow users to store and access data on the cloud. A cloud storage system can allow users to maintain a variety of content items stored in a centralized manner and accessible from any client device. Some cloud storage systems allow users to share data with other users and access the data in a collaborative fashion. Moreover, some cloud storage systems may support synchronization of copies of data across a number of client devices so each copy of the data is identical and locally accessible from the client devices. The synchronization functionality can enable users to store local copies of the data on their client devices and access the local copies of the data from their client devices. The local copies of the data can be synchronized with the data on the cloud storage systems to ensure consistency between local and cloud copies of the data. The local copies of the data may provide users with faster access to the data and may allow users to access the data when their client devices are offline.

Increasingly, users are using a variety of cloud storage systems to store their data. As a result, a user's data is often stored across different cloud storage systems. Disadvantageously, the increasing use of different cloud storage systems to store a user's content items has created an explosion of user data that is increasingly scattered across different systems and devices. The scattered nature of a user's content items can significantly hamper the user's ability to organize their content items, prevent the user from gaining uniform or complete access to their content items and associated functionalities from a centralized location, limit a user's ability to collaborate with different users, hinder a user's ability to track the storage location of the user's content items, etc. These issues can quickly escalate as the amount of content items maintained by, and shared with, a user increases.

BRIEF DESCRIPTION OF THE DRAWINGS

The disclosed and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Cloud storage systems allow users to store and access content items across multiple devices. The content items may include, for example and without limitation, files, documents, messages (e.g., email messages, text messages, etc.), media files (e.g., photos, videos, audio files), folders, news feeds, and/or any other type of data or content. Content items on a cloud storage system may be shared with multiple users, edited, deleted, added, renamed, moved and/or otherwise accessed or manipulated. However, as previously explained, users are increasingly using a variety of cloud storage systems to store their content items. As a result, a user's content items are often stored across different cloud storage systems.

The technologies described herein can provide an integrated and unified solution that addresses or overcomes the foregoing and other technical problems and limitations. For example, the technologies herein can provide a cloud content management system that can store, organize, and manage copies and/or representations of content items that are stored across different cloud storage platforms and allow users to access such content items through the cloud content management system, despite such content items being stored on separate cloud storage platforms. Thus, users can access all their content items via a single content management system, including content items stored on the content management system itself as well as content items stored on other content management systems.

Moreover, the content management system described herein can synchronize content items stored on other cloud storage systems with representations or copies of such content items stored on the content management system, in order to maintain the representations or copies of such content items updated and consistent with the content items on the other cloud storage systems. In some cases, the content management system described herein can also extend various functionalities or features of content items stored on different cloud storage platforms and accessible through the content management system, to include functionalities or features provided by the content management system, such as sharing, organization, collaboration, and security functionalities or features.

Figure 1:
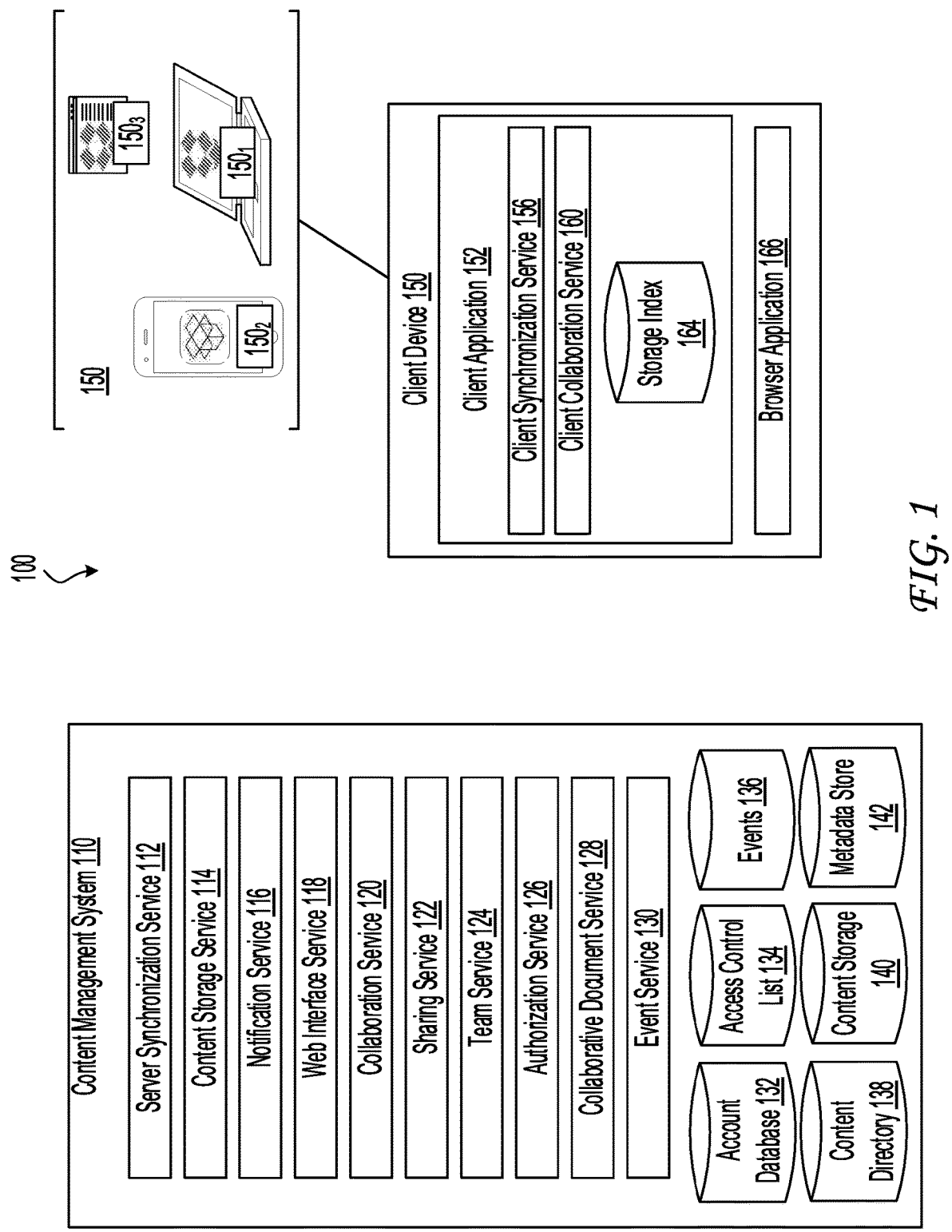
FIG. 1 shows an example configuration of a computing environment including a content management system and client devices, according to some examples.

In some aspects, the disclosed technologies are deployed in the context of a content management system, such as a cloud storage service, having content item synchronization capabilities and collaboration features, among others. An example configuration 100 of a content management system and environment is shown in FIG. 1, which depicts an example content management system 110 interacting with an example client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 132. Account database 132 can store profile information for registered entities. In some cases, profile information for registered entities includes a username and/or email address. Account database 132 can include account management information, such as account type (e.g. various tiers of free or paid accounts), storage space allocated, storage space used, client devices 150 having a registered content management client application 152 resident thereon, security settings, personal configuration settings, etc.

Account database 132 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 140. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, directory, container, or a plurality of content items that are related or grouped by a common attribute. In some embodiments, content storage 140 is combined with other types of storage or databases to handle specific functions. Content storage 140 can store content items, while metadata regarding the content items or objects associated with the content items or user accounts can be stored in metadata store 142. Likewise, data regarding where a content item is stored in content storage 140 can be stored in content directory 138.

Each of the various storages/databases such as content storage 140, content directory 138, and metadata store 142 can include one or more storages or databases and can be distributed over one or more devices and locations. Other configurations are also possible. For example, data from content storage 140, content directory 138, and/or metadata store 142 may be combined into one or more content storages or databases or further segmented into additional content storages or databases. Thus, content management system 110 may include more or fewer storages and/or databases than shown in FIG. 1.

In some examples, content storage 140 is associated with at least one content storage service 114, which includes software or other processor executable instructions for managing the storage of content items including, but not limited to, receiving content items for storage, preparing content items for storage, selecting a storage location for the content item, retrieving content items from storage, etc. In some examples, content storage service 114 can divide a content item into smaller chunks for storage at content storage 140. The location of each chunk making up a content item can be recorded in content directory 138. Content directory 138 can include a content entry for each content item stored in content storage 140. The content entry can be associated with a unique ID, which identifies a content item.

In some examples, the unique ID, which identifies a content item in content directory 138, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 114 can output a unique ID for each content item.

Content storage service 114 can also designate or record a content path for a content item in metadata store 142. In some cases, the content path can include the name of the content item and/or folder hierarchy associated with the content item. For example, the content path can include a folder or path of folders in which the content item is stored in a local file system on a client device. While content items can be stored in content storage 140 in blocks and may not be stored under a tree like directory structure, such directory structure is a comfortable navigation structure for users. Content storage service 114 can define or record a content path for a content item wherein the "root" node of a directory structure can be a namespace for each account. Within the namespace can be a directory structure defined by a user of an account and/or content storage service 114. Metadata store 142 can store the content path for each content item as part of a content entry.

In some examples, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 140.

While the directory structure in which an account views content items does not correlate to storage locations at content management system 110, the directory structure can correlate to storage locations on client device 150 depending on the file system used by client device 150.

As addressed above, a content entry in content directory 138 can include the location of each chunk making up a content item. For example, the content entry can include content pointers that identify the location in content storage 140 of the chunks that make up the content item.

In addition to a content path and content pointer, a content entry in content directory 138 can include a user account identifier that identifies the user account that has access to the content item and/or a group identifier that identifies a group with access to the content item and/or a namespace to which the content entry belongs.

Content storage service 114 can decrease the amount of storage space utilized by identifying duplicate content items or duplicate blocks that make up a content item or versions of a content item. Instead of storing multiple copies, content storage 140 can store a single copy of the content item or block of the content item and content directory 138 can include a pointer or other mechanism to link the duplicates to the single copy.

Content storage service 114 can also store metadata describing content items, content item types, folders, file path, and/or the relationship of content items to various accounts, collections, or groups in metadata store 142, in association with the unique ID of the content item.

Content storage service 114 can also store a log of data regarding changes, access, etc., in metadata store 142. Metadata store 142 can include the unique ID of the content item and a description of the change or access action along with a time stamp or version number and any other relevant data. Metadata store 142 can also include pointers to blocks affected by the change or content item access. Content storage service can provide the ability to undo operations, by using a content item version control that tracks changes to content items, different versions of content items (including diverging version trees), and a change history that can be acquired from metadata store 142.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a browser application 166 and accessing content items via a web interface, which can be provided by web interface service 118 as explained herein.

While example client devices $150_1$, $150_2$, and $150_3$ are depicted in form factors such as a laptop, mobile device, or web browser, it should be understood that the descriptions thereof are not limited to devices of these example form factors. For example, a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In some examples, client devices are associated with an account of content management system 110, but in some examples client devices can access content using shared links and without using an account.

As noted above, some client devices can access content management system 110 using browser application 166. Browser application 166 can be, for example, a web browser. In some examples, client device 150 can use browser application 166 to access web pages and content on content management system 110. However, client devices can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system 110 and/or content storage service 114. In some examples, client synchronization service 156 can perform some functions of content storage service 114 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some examples, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 114 can store the changed or new block for the content item and update account database 132, content directory 138, content storage 140, metadata store 142, etc. as appropriate.

When synchronizing from content management system 110 to client device 150, a mount, modification, addition, deletion, move of a content item recorded in metadata store 142 can trigger a notification to be sent to client device 150 using notification service 116. When client device 150 is informed of the change a request changes listed in metadata store 142 since the last synchronization point known to the client device. When client device 150 determines that it is out of synchronization with content management system 110, client synchronization service 156 requests content item blocks including the changes, and updates its local copy of the changed content items.

In some examples, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some examples, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 122. Sharing content by providing a link to the content can include making the content item accessible from any computing device in network communication with content management system 110. However, in some examples, a link can be associated with access restrictions enforced by content management system 110 and access control list database 134. Sharing content can also include linking content using sharing service 122 to share content within content management system 110 with at least one additional user account (in addition to the original user account associated with the content item) so that each user account has access to the content item. The additional user account can gain access to the content by accepting the content, which will then be accessible through either web interface service 118 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110, sharing service 122 can add a user account identifier or multiple user account identifiers to a content entry in access control list database 134 associated with the content item, thus granting the added user account access to the content item. Sharing service 122 can also remove user account identifiers from a content entry to restrict a user account's access to the content item. Sharing service 122 can record content item identifiers, user account identifiers given access to a content item, and access levels in access control list database 134. For example, in some embodiments, user account identifiers associated with a single content entry can specify different permissions for respective user account identifiers with respect to the associated content item.

To share content items outside of content management system 110, sharing service 122 can generate a custom network address, such as a uniform resource locator (URL), which allows any web browser to access the content item or collection in content management system 110 without any authentication. To accomplish this, sharing service 122 can include content identification data in the generated URL, which can later be used to properly identify and return the requested content item. For example, sharing service 122 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 122 can also be configured to record in access control list database 134 that a URL to the content item has been created. In some examples, the content entry associated with a content item can include a URL flag indicating whether a URL to the content item has been created. For example, the URL flag can be a Boolean value initially set to 0 or false to indicate that a URL to the content item has not been created. Sharing service 122 can change the value of the flag to 1 or true after generating a URL to the content item.

In some examples, sharing service 122 can associate a set of permissions to a URL for a content item. For example, if a user attempts to access the content item via the URL, sharing service 122 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some examples, sharing service 122 can also be configured to deactivate a generated URL. For example, each content entry can also include a URL active flag indicating whether the content should be returned in response to a request from the generated URL. Sharing service 122 may only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 122 can reactivate the URL by again changing the value of the URL active flag to 1 or true. A user can thus easily restore access to the content item without the need to generate a new URL.

In some examples, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 130 can generate an event for such interaction. When event service 130 detects a user interaction with a content item and/or another user, event service 130 can create an event identifier (e.g., unique event identifier) and event type, and associate the event identifier and event type with the user (e.g., user identifier and namespace identifier) to create an event or event record for the interaction. After the event is created, event service 130 can send the event identifier and any information associated with the event to events store 136 for storage.

Events store 136 can include one or more storage systems, such as one or more databases, for storing events and associated information. In some examples, events store 136 can include a distributed database or distributed storage system. Events store 136 can receive and store the event data for access by content management system 110.

Team Service

In some examples, content management system 110 includes team service 124. Team service 124 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 124 can provide a common shared space for the team, private user account folders, and access limited shared folders. Teams service 124 can also provide a management interface for an administrator to manage collections and content items associated with one or more teams, and can manage user accounts that are associated with the one or more teams.

Authorization Service

In some examples, content management system 110 includes authorization service 126. Authorization service 126 can ensure that a user account attempting to access a namespace has appropriate rights to access the namespace. Authorization service 126 can receive a token from client application 152 that is associated with a request to access a namespace, and can return the capabilities and/or access permitted to the user account. For user accounts with multiple levels of access (e.g. a user account with user rights and administrator rights), authorization service 126 can also request or need explicit privilege escalation to avoid unintentional actions by administrators.

Presence and Seen State

In some examples, content management system 110 can provide information about how users with which a content item is shared are interacting or have interacted with the content item. In some cases, content management system 110 can report that a user with which a content item is shared is currently viewing the content item. For example, client collaboration service 160 can notify notifications service 116 when client device 150 is accessing the content item. Notifications service 116 can then notify all client devices of other users having access to the same content item of the presence of the user of client device 150 with respect to the content item. Content management system 110 (e.g., via event service 130) and/or client device 150 can track user interactions with content, such as read or write events, and maintain a history of such events and interactions for a user (e.g., events store 136).

In some cases, content management system 110 can report a history of user interactions with a shared content item. Collaboration service 120 can query data sources such as events store 136 and metadata store 142 to determine that a user has saved the content item, that a user has yet to view the content item, etc., and disseminate this status information using notification service 116 to other users so that they can know who currently is or has viewed or modified the content item.

Collaboration service 120 can facilitate comments associated with content, even if a content item does not natively support commenting functionality. Such comments can be stored in metadata store 142.

Collaboration service 120 can originate and transmit notifications for users. For example, a user can mention another user in a comment and Collaboration service 120 can send a notification to that user that he has been mentioned in the comment. Various other content item events can trigger notifications, including deleting a content item, sharing a content item, etc.

Collaboration service 120 can provide a messaging platform whereby users can send and receive instant messages, voice calls, emails, etc.

Collaboration Content Items

In some examples, content management system 110 can include collaborative document service 128, which can provide an interactive content item collaboration platform whereby users can simultaneously create collaboration content items, comment in the collaboration content items, and manage tasks within the collaboration content items. Collaboration content items can include content items that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items.

Multiple users may access, view, edit, and collaborate on collaboration content items at the same time or at different times. In some examples, this can be managed by having multiple users access a content item through a web interface provided by web interface service 118, and there they can work on the same copy of the content item at the same time.

Collaboration Companion Interface

In some examples, client collaboration service 160 can provide a native application companion interface for the purpose of displaying information relevant to a content item being presented on client device 150. In cases wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some examples, one or more of the services or storages/databases discussed above can be accessed using public or private application programming interfaces (APIs). Certain software applications can access account database 132, access control list database 134, events store 136, content directory 138, content storage 140, metadata store 142, etc., via an API on behalf of a user. For example, a software package such as an application running on client device 150 can programmatically make API calls directly to content management system 110 when a user provides authentication credentials, to read, write, create, delete, share, or otherwise manipulate content.

A user can view or manipulate content stored in a user account via a web interface generated and served by web interface service 118. For example, the user can navigate in a browser application 166 to a web address provided by content management system 110. Changes or updates to content in the content storage 140 made through the web interface, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some examples, the application can include a content management system specific component. For example, the content management system specific component can be a stand-alone application 152, one or more application plug-ins, and/or a browser extension. However, the user can also interact with content management system 110 via a third-party application, such as browser application 166, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using browser application 166.

In some examples, client application 152 can be configured to manage and synchronize content for more than one account of content management system 110. In such examples, client application 152 can remain logged into multiple accounts and provide normal services for the multiple accounts. In some cases, each account can appear as folder in a file system, and the content items within that folder can be synchronized with content management system 110. In some examples, client application 152 can include a selector to choose one of the multiple accounts to be the primary account or default account.

While content management system 110 is presented with specific components, it should be understood by one skilled in the art, that the architectural configuration of content management system 100 is simply one possible configuration and that other configurations with more or fewer components are possible. Further, a service can have more or less functionality, even including functionality described as being with another service. Moreover, features described herein with respect to an example or implementation can be combined with features described with respect to another example or implementation.

Figure 2:
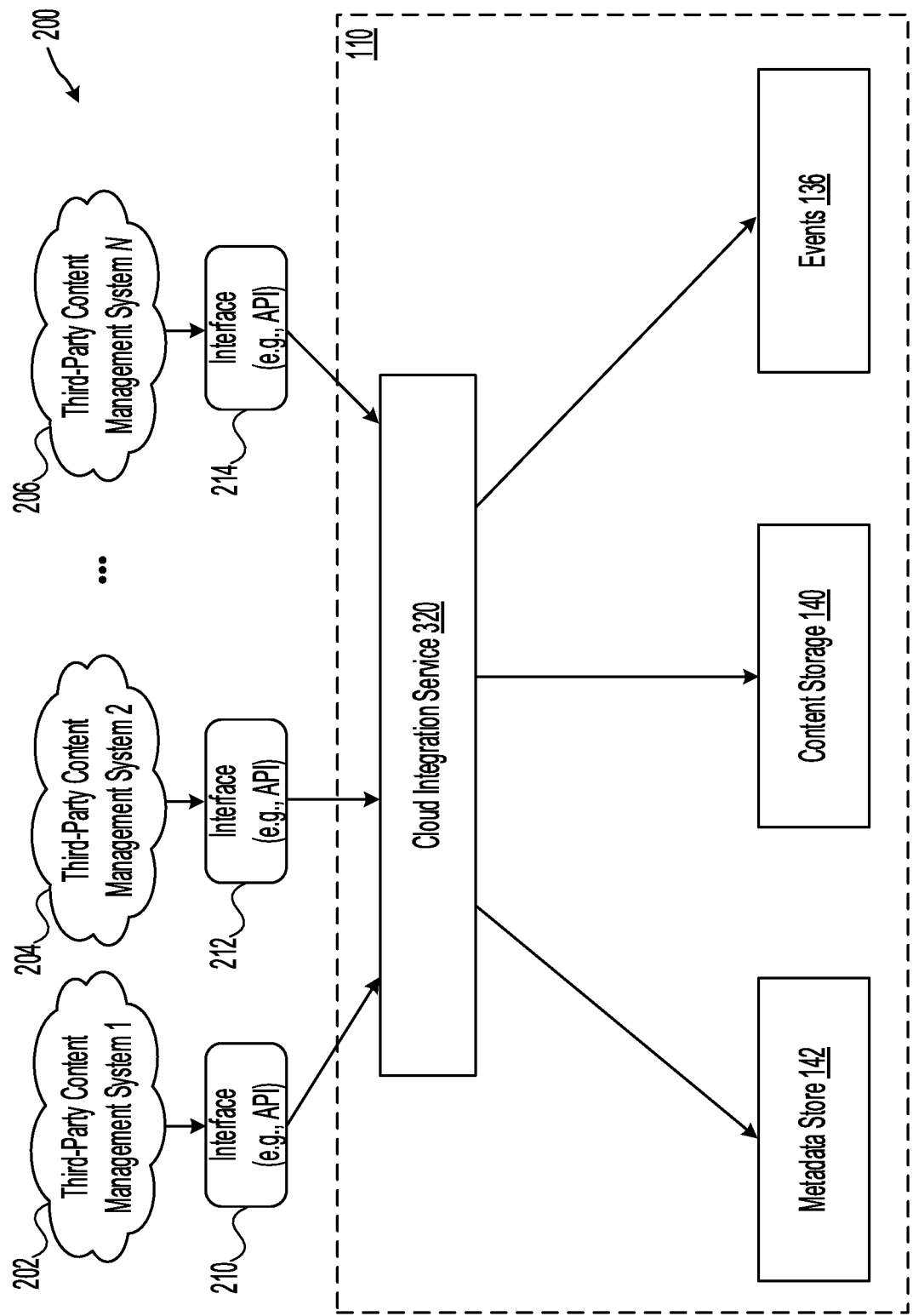
FIG. 2 shows an example architecture for synchronizing collections of content items between different content management systems, according to some examples.

FIG. 2 shows example architecture 200 for synchronizing collections between content management system 110 and different cloud services, and integrating data and functionalities of content items stored on or supported by the different cloud services with corresponding placeholders stored on content management system 110. In this example, the different cloud services include third-party content management systems 202, 204, and 206, which can represent different cloud storage platforms or systems, which can be physically, logically, and otherwise separate and independent of each other, and which can be operated by different companies As referenced herein, the collections can include, for example and without limitation, folders, directories, albums, drives, containers or objects storing one or more content items, and/or any other groupings of content items. For example, a collection can include a folder on a content management system (e.g., 110, 202, 204, 206), the contents (or a portion of the contents) of a user's account on a content management system, a Really Simple Syndication (RSS) feed, a photo album, a video and/or audio channel (e.g., a streaming channel, a podcast channel, a radio channel, etc.), a collaboration project, a storage volume, and the like. Moreover, as referenced herein, the placeholders can include, for example and without limitation, links to content items, pointers to content items, representations of content items referencing such content items, content items having encoded addresses associated with remote content items, etc.

Content management system 110 can store and manage collections and placeholders respectively associated with collections and content items stored on third-party content management systems 202, 204, and 206, along with any other content items stored on content management system 110. Users can access (e.g., via client devices 150) such content items stored on third-party content management systems 202, 204, and 206 through the placeholders stored on content management system 110. Thus, through content management system 110, the users can have centralized access to their content items stored on content management system 110 as well as their content items stored on third-party content management systems 202, 204, and 206.

In some cases, third-party content management systems 202, 204, 206 can store and manage content items associated with corresponding placeholders stored on content management system 110; and can provide respective content, functionalities and/or features (e.g., commenting, collaboration, sharing, editing, etc.) for such content items when accessed through the corresponding placeholders on content management system 110. For example, content management system 110 can store a placeholder referencing a content item on a third-party content management system (e.g., 202, 204, 206), and obtain access to the content and/or functionalities associated with the content item through the placeholder on content management system 110. When a client device (e.g., 150) accesses (e.g., clicks, selects, activates, etc.) the placeholder on content management system 110, the client device can be directed to the third-party content management system in order to obtain the content of the associated content item from the third-party content management system.

Moreover, content management system 110 can create and store collections of content items and link the stored collections to associated collections on third-party content management systems 202, 204, 206. The collections stored on content management system 110 can represent and reference the associated collections on third-party content management systems 202, 204, 206. When creating such collections, content management system 110 can automatically identify what content items are stored on the associated collections at third-party content management systems 202, 204, 206, and create and store placeholders corresponding to the content items in the associated collections on third-party content management systems 202, 204, 206. The placeholders can be stored within the collections created and stored on content management system 110, which correspond to the associated collections on third-party content management systems 202, 204, 206.

In some examples, content management system 110 can use an address of a remote collection on a third-party content management system (e.g., 202, 204, 206) to create and store an entire collection corresponding to the remote collection on the third-party content management system and link that collection to the remote collection on the third-party content management system. For example, content management system 110 can obtain an address of a photo album stored on third-party content management system 202. Content management system 110 can use that address to obtain, from third-party content management system 202, the addresses of the photos (and any other content items) stored in the photo album. Content management system 110 can then use the addresses obtained from third-party content management system 202 for the photos (and any other content items) in the photo album, to create a placeholder for each of the photos (and any other content items) in the photo album, and encode each placeholder with the address of the photo (or other content item) that corresponds to that placeholder.

Content management system 110 can then store all the placeholders, which are encoded with the addresses), on a collection (e.g., a photo album) created based on the photo album on third-party content management system 110 and stored on content management system 110. Moreover, in some cases, content management system 110 can use the address of the photo album on third-party content management system 202 to link the collection (e.g., photo album) created by, and stored on, content management system 110 with the photo album on third-party content management system 202. This way, using the address of the photo album on third-party content management system 202, content management system 110 can not only create a collection (e.g., photo album) linked and corresponding to the photo album on third-party content management system 202, but can also automatically populate the collection in content management system 110 with placeholders linked and corresponding to the photos (and any content items) in the photo album on third-party content management system 202.

The placeholders in collections created by, and stored on, content management system 110 can include content item representations referencing, pointing to, or linked to corresponding content items in the collections stored on third-party content management systems 202, 204, 206. For example, the placeholders may include a link, address, or pointer to the corresponding content items in the collections stored on third-party content management systems 202, 204, 206. In some examples, when client device 150 tries to access a placeholder (e.g., by clicking on the placeholder or selecting the placeholder), client device 150 can be redirected to the corresponding content item on a third-party content management system (e.g., 202, 204, 206). In other examples, when client device 150 tries to access the placeholder, client device 150 can extract and use a link, address, or pointer encoded in the placeholder to obtain the contents of the associated content item from the third-party content management system storing the associated content item.

In some cases, a collection stored on content management system 110 can appear or can be depicted as a copy of the corresponding collection stored on a third-party content management system. Moreover, in some cases, a placeholder stored within the collection on content management system 110 can appear or can be depicted as a copy of, or a link to, a corresponding content item in the collection stored on the third-party content management system. Thus, the collection stored on content management system 110 and the placeholders within the collection can appear or can be depicted as a copy of the collection on the third-party content management system, including the content items (represented by the placeholders) stored in the collection on the third-party content management system.

In some examples, the placeholders within the collection on content management system 110 may not store the actual data contents of the corresponding content items in the collection stored on the third-party content management system. Instead, such placeholders may include a path, link, pointer, or address to the corresponding content items, which can be used to retrieve/access such data contents from the third-party content management system. Accordingly, in such examples, the collection and placeholders stored on content management system 110 can provide a representation of another collection stored on a third-party content management system and the content items within that collection, and can allow client device 150 to access the associated content items on the third-party content management system from a user account at content management system 110.

A user can store, on content management system 110, collections and placeholders corresponding to collections and content items stored on different third-party content management systems, and access such collections and placeholders through their user account on content management system 110. Thus, a user can maintain on content management system 110 (e.g., in association with their user account) such collections and placeholders along with their content items on content management system 110, such that their content items stored on content management system 110 and any other third-party content management system are all accessible from their user account on content management system 110.

As previously noted, third-party content management systems 202, 204, 206 can store collections of content items and provide users access to such collections and content items. Third-party content management systems 202, 204, 206 can communicate with cloud integration service 220 on content management system 110 via interfaces 210, 212, 214, to receive or provide data and/or metadata associated with any collections of content items stored on third-party content management systems 202, 204, 206. Interfaces 210, 212, 214 can be, for example, application programming interfaces (APIs) for establishing communications channels and/or exchanging data between cloud integration service 220 and third-party content management systems 202, 204, 206. Cloud integration service 220 can be a service that implements the logic and/or functionalities for interacting with third-party content management systems 202, 204, 206.

In some examples, cloud integration service 220 can communicate with third-party content management systems 202, 204, 206 to retrieve information about collections of content items stored on third-party content management systems 202, 204, 206, and use such information to create and store corresponding collections and placeholders on content management system 110. For example, to create and store on content management system 110 a collection corresponding to a remote collection on a third-party content management system (e.g., 202, 204, 206), cloud integration service 220 can communicate with the third-party content management system to retrieve information identifying what content items are contained within the remote collection on the third-party content management system.

The information can identify a path or address (e.g., a URL) of each content item in the remote collection on the third-party content management system. The information, including the paths or addresses, can be used by cloud integration service 220 to automatically populate the corresponding collection stored on content management system 110 with placeholders representing the content items in the remote collection on the third-party content management system. The placeholders can include or can be encoded with the paths or addresses of such content items to allow client device 150 to access the content items on the third-party content management system through the placeholders within the collection stored on content management system 110.

In some examples, cloud integration service 220 can communicate with third-party content management systems 202, 204, 206 to retrieve from third-party content management systems 202, 204, 206 metadata associated with remote collections stored on third-party content management systems 202, 204, 206 as well as content items in the remote collections; use the received metadata to update metadata associated with collections and placeholders stored on content management system 110 and associated with the remote collections stored on third-party content management systems 202, 204, 206; communicate with third-party content management systems 202, 204, 206 to synchronize such collections stored on content management system 110 (and associated placeholders) with the remote collections stored on third-party content management systems 202, 204, 206; etc.

In some examples, cloud integration service 220 can communicate with third-party content management systems 202, 204, 206 to also send to third-party content management systems 202, 204, 206 updates and/or metadata associated with such collections stored on content management system 110 and associated with the remote collections stored on third-party content management systems 202, 204, 206; exchange with third-party content management systems 202, 204, 206 activity information associated with such collections stored on content management system 110; authenticate with third-party content management systems 202, 204, 206; provide tokens or authentication information to third-party content management systems 202, 204, 206 for allowing third-party content management systems 202, 204, 206 to authenticate with content management system 110; etc.

Moreover, cloud integration service 220 can support various operations for communicating with third-party content management systems 202, 204, 206; accessing features and functionalities associated with collections and placeholders stored on content management system 110; accessing features and functionalities provided by third-party content management systems 202, 204, 206 for the remote collections stored on third-party content management systems 202, 204, 206; accessing features and functionalities associated with content management system 110; interacting with collections and placeholders stored on content management system 110; interacting with remote collections stored on third-party content management systems 202, 204, 206; interacting with third-party content management systems 202, 204, 206 to receive or provide data and/or functionalities associated with collections and placeholders on content management system 110; etc.

Non-limiting examples of operations supported by cloud integration service 220 include operations to create collections and placeholders contained within collections; operations to authenticate with third-party content management systems 202, 204, 206; operations to receive or update metadata associated with collections stored on third-party content management systems 202, 204, 206; operations to retrieve collections and/or related information from content storage 140, client device 150 and/or third-party content management systems 202, 204, 206; operations to synchronize collections on content management system 110 with collections on third-party content management systems 202, 204, 206; commenting operations; operations to generate and/or present previews of placeholders in collections on content management system 110; operations to share collections, placeholders, and/or associated data with user accounts; operations for implementing access permissions to collections stored on content management system 110 and/or associated collections stored on third-party content management systems 202, 204, 206; and so forth.

Cloud integration service 220 can communicate with metadata store 142 to store or access metadata associated with collections stored on content management system 110 and associated with collections stored on third-party content management systems 202, 204, 206. Metadata store 142 can store and provide such metadata for use by cloud integration service 220 and any other service in content management system 110. The metadata can include, for example and without limitation, information regarding changes to collections (stored on content management system 110 and/or third-party content management systems 202, 204, 206); access information associated with the collections; data logs associated with the collections; unique identifiers (IDs) associated with the collections; description information associated with the collections; version numbers or information associated with the collections; timestamps associated with filesystem entries corresponding to the collections; change history information for the collections; pointers, paths, or addresses to collections and/or content items on third-party content management systems 202, 204, 206; permissions set for the collections, associated placeholders, and/or associated content items; state information; etc.

Cloud integration service 220 can also communicate with metadata store 142 to update or retrieve metadata and objects in metadata store 142. Metadata store 142 can store other metadata and objects such as entities or associations pertaining to user accounts, collections, placeholders, user groups, namespaces, memberships, etc. For example, metadata store 142 may store, without limitation, metadata describing collections, placeholders, content item types associated with the placeholders, comments, indexing data, access permissions, user or group memberships, sharing information, etc. In some examples, metadata store 142 can store information describing the relationship of collections and placeholders to one or more accounts, groups, namespaces, folders, team entities, etc., in metadata store 142.

Cloud integration service 220 can communicate with content storage 140 to store and/or retrieve content from content storage 140. Cloud integration service 220 can communicate with content storage 140 to store and retrieve collections representing or corresponding to remote collections on third-party content management systems 202, 204, 206, and store placeholders corresponding to content items stored within the remote collections on third-party content management systems 202, 204, 206. For example, in some cases, content storage 140 may store collections created based on remote collections on third-party content management systems 202, 204, 206 as well as placeholders corresponding to content items within the remote collections, to allow client device 150 to access to collections and placeholders from content storage 140. In this example, cloud integration service 220 may retrieve, store, or update such collections and placeholders in content storage 140, and may synchronize such collections and placeholders with the remote collections and associated content items stored on third-party content management systems 202, 204, 206.

In some examples, cloud integration service 220 can store such collections and placeholders on content storage 140 in association with a user account on content management system 110 having access to the collections and placeholders. This way, a user can access such collections and placeholders right from the user's account on content management system 110, as well as any other content items stored on content management system 110 for the user's account.

In some examples, cloud integration service 220 can communicate with events store 136 to store, retrieve, and/or update activity and event information associated with collections and/or associated placeholders. Cloud integration service 220 can monitor events or activity from events store 136, obtain status information associated with collections and/or associated placeholders from events store 136, process events and/or metrics based on information in events store 136, generate or provide notifications or alerts based on information in events store 136, etc.

Figure 3:
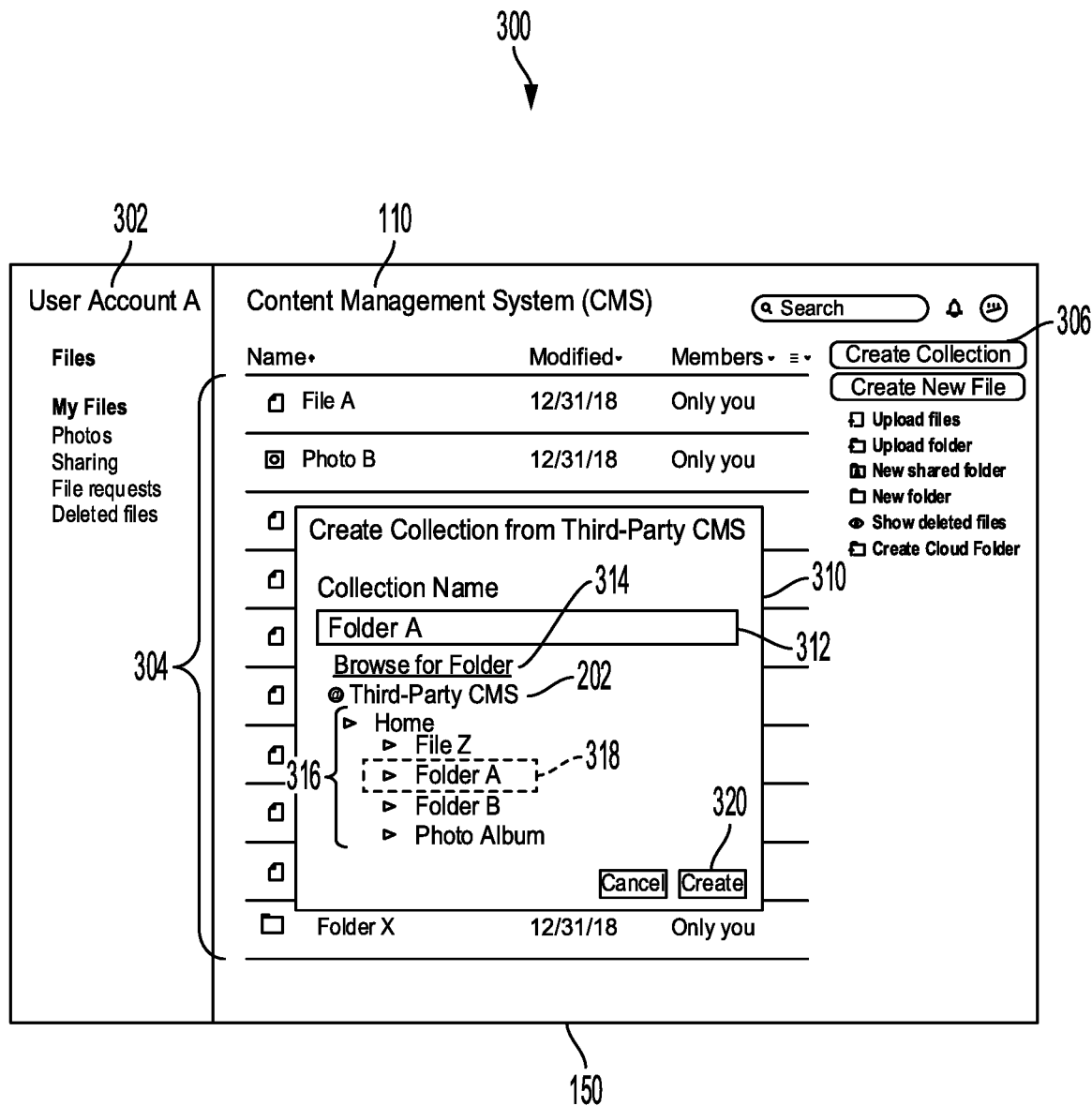
FIG. 3 shows an example interface for creating and storing, on a content management system, a collection of content items from a third-party content management system, according to some examples.

FIG. 3 shows example interface 300 for creating and storing on content management system 110 a collection from third-party content management system 202. A user can access interface 300 from client device 150 via user account 302 associated with the user. User account 302 can be an account registered on content management system 110 and providing access to content items 304 stored on content management system 110 in association with user account 302.

In this example, interface 300 depicts content items 304 on content management system 110, which are accessible from content management system 110 through user account 302. Interface 300 also depicts collection interface 310 for creating and storing on content management system 110 a collection that is based on a remote collection stored on a third-party content management system (e.g., 202, 204, 206). Collection interface 310 can be accessed through interface element 306 presented on interface 300. Interface element 306 can allow a user to access collection interface 310 for creating a collection corresponding to a remote collection on a third-party content management system and automatically storing in the collection placeholders corresponding to the content items in the remote collection.

Collection interface 310 can include input element 312 where a user can define a name for the collection being created and stored on content management system 110. In some examples, the user can manually define the name for the collection through input element 312. In other examples, the name can be populated automatically based on the name of the remote collection selected for creating and storing a corresponding collection on content management system 110.

Collection interface 310 can also include navigation element 314 for browsing/navigating remote collections on third-party content management systems and selecting a remote collection to be created and stored on content management system 110. In some examples, the user can define the third-party content management system to be browsed/navigated and/or the address of the third-party content management system. For example, the user can identify third-party content management system 202 to allow the user to browse/navigate content items 316 stored on third-party content management system 202 and select a specific collection from content items 316.

In other examples, the user can link one or more third-party content management systems to user account 302 associated with the user. Such one or more third-party content management systems linked to user account 302 can automatically appear as browsing/navigation options in navigation element 314. The user can then select a specific third-party content management system to browser/navigate content items stored on that third-party content management system and select a specific collection from the third-party content management system.

In this example, third-party content management system 202 is selected or enabled in navigation element 314. Thus, content items 316 depicted in navigation element 314 can refer to content items stored on third-party content management system 202. The user can then select a remote collection on third-party content management system 202 to create and store a collection on content management system 110 and link the collection to the remote collection on third-party content management system 202. In this example, remote collection 318 on third-party content management system 202 is shown as being selected by the user through navigation element 314.

Once remote collection 318 has been selected from navigation element 314, the user can select or activate (e.g., click, trigger, etc.) option 320 to create and store on content management system 110 a collection linked to remote collection 318. When the user selects or activates option 320, content management system 110 can establish (e.g., via interface 210) a communication channel and/or communicate with third-party content management system 202 to obtain information about remote collection 318. Content management system 110 can use such information to create a collection on content management system 110, link the collection to remote collection 318, and populate the collection with placeholders corresponding to content items in remote collection 318. Each placeholder can represent, and point to, a respective content item in remote collection 318.

The information can identify each content item stored in remote collection 318. For example, the information can include the name and address of each content item stored in remote collection 318. In some examples, the information can also include other information or metadata such as, for example, access permissions, timestamps, content item types, a portion of data in a content item for generating a preview of such content item, tags, content hierarchies, file or directory structures, etc.

As previously noted, content management system 110 can use such information to create (e.g., via cloud integration service 220) the collection on content management system 110 and automatically populate the collection with placeholders corresponding to the content items in remote collection 318. The placeholders can include the name and address of respective content items in remote collection 318. For example, the placeholders can be labeled based on the names of the respective content items in remote collection 318 and can be encoded with the addresses of the respective content items so that the respective content items (and the associated data) can be accessed from the placeholders. The collection created and stored on content management system 110 can be linked to remote collection 318.

By linking the collection on content management system 110 to remote collection 318, content management system 110 can synchronize the collection on content management system 110 with remote collection 318 and ensure that any changes/updates to remote collection 318 (and/or content items in remote collection 318) are propagated to the collection on content management system 110. In some examples, by linking the collection on content management system 110 to remote collection 318 in order to synchronize the collection on content management system 110 with remote collection 318, content management system 110 can also ensure that any changes/updates to the collection (and/or placeholders in the collection) stored on content management system 110 are propagated to remote collection 318 (and/or the content items in remote collection 318). Thus, in some examples, synchronization between the collection on content management system 110 and remote collection 318 on third-party content management system 202 can be bi-directional (e.g., from third-party content management system 202 to content management system 110, and vice versa).

Figure 4:
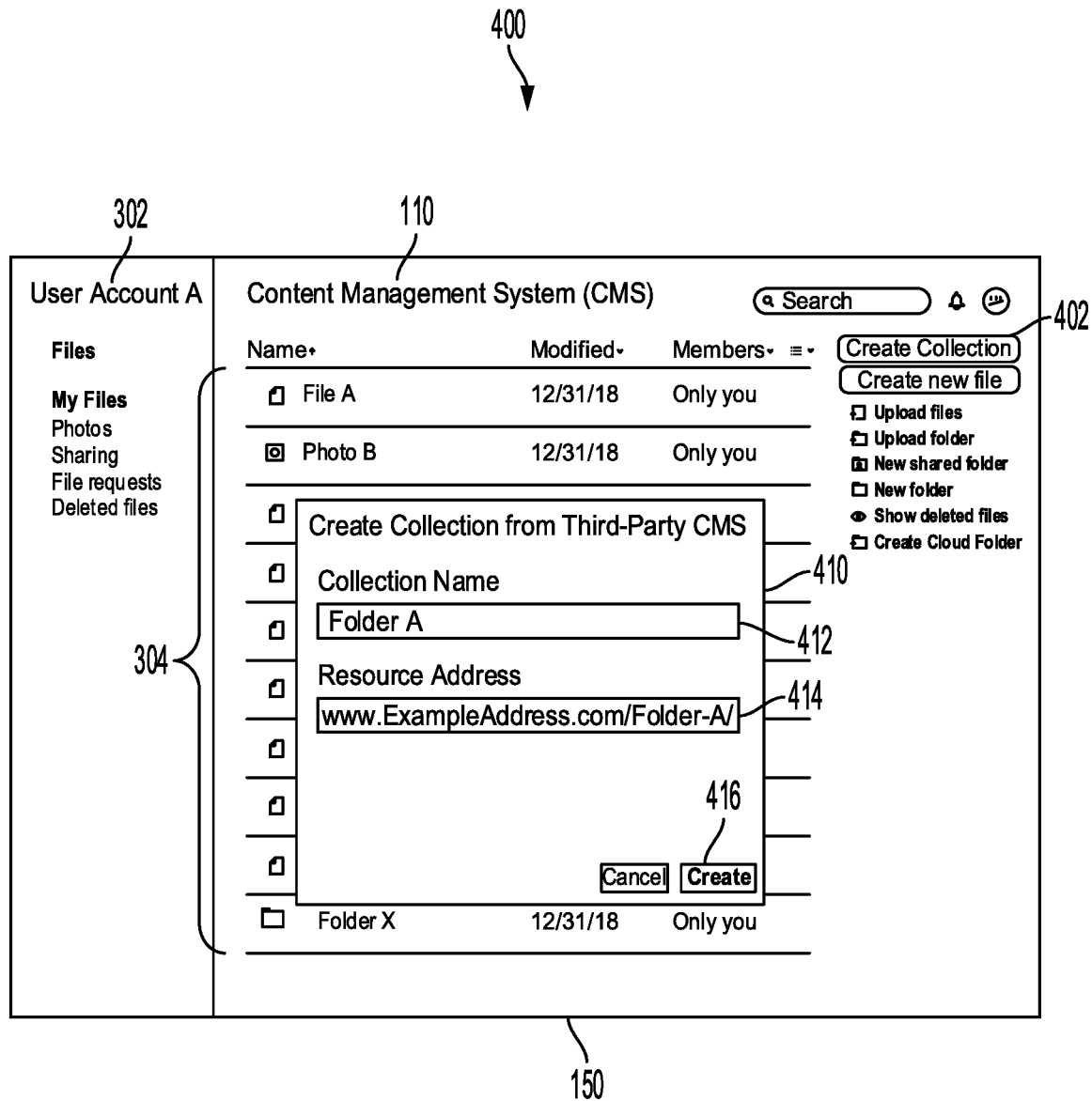
FIG. 4 shows another example interface for creating and storing, on a content management system, a collection of content items from a third-party content management system, according to some examples.

FIG. 4 shows another example interface 400 for creating and storing on content management system 110 a collection from third-party content management system 202. A user can access interface 400 from client device 150 via user account 302, as previously described with respect to interface 300. Moreover, interface 400 similarly depicts content items 304 on content management system 110, which are accessible from content management system 110 through user account 302.

Interface 400 also depicts collection interface 410 for creating and storing on content management system 110 a collection based on a remote collection stored on a third-party content management system (e.g., 202, 204, 206). Collection interface 410 can be accessed through interface element 402 from interface 400. Interface element 402 can allow a user to access collection interface 410 for creating a collection corresponding to a remote collection on a third-party content management system and automatically storing in the collection placeholders corresponding to the content items in the remote collection.

Collection interface 410 can include input element 412 where a user can define a name for the collection being created and stored on content management system 110. In some examples, the user can manually define the name for the collection through input element 412, where the chosen name may or may not correspond to the name of the remote collection. In other examples, the name can be populated automatically based on the name of the remote collection selected or defined for creating and storing a corresponding collection on content management system 110.

Collection interface 410 can also include resource address element 414, where the user can specify the address or path of the remote collection to be created on content management system 110. In some examples, the user can specify or input the URL of the remote collection to be created. The remote collection can be a collection stored on a third-party system or platform, such as third-party content management system 202. Once the user has specified or entered the address or path of the remote collection through resource address element 414, the user can select or activate option 416 to create a collection on content management system 110 based on the remote collection associated with the address or path specified or entered in resource address element 414, and link the collection on content management system 110 to the remote collection.

When the user selects or activates option 416, content management system 110 can establish (e.g., via interface 210, 212, or 214) a communication channel and/or communicate with the third-party content management system (e.g., 202, 204, 206) containing the remote collection to obtain information about the remote collection. Content management system 110 can use such information to create the collection on content management system 110, link the collection in content management system 110 to the remote collection on the third-party content management system, and populate the collection on content management system 110 with placeholders corresponding to the content items in the remote collection. Each placeholder can represent, and point to, a respective content item in the remote collection.

The information can identify each content item stored in the remote collection. For example, the information can include the name and address of each content item stored in the remote collection. In some examples, the information can also include other information or metadata such as, for example, access permissions, timestamps, content item types, a portion of data in a content item for generating a preview of such content item, tags, content hierarchies, file or directory structures, etc.

As previously noted, content management system 110 can use such information to create (e.g., via cloud integration service 220) the collection on content management system 110 and automatically populate the collection with placeholders corresponding to the content items in the remote collection. The placeholders can include the name and address of respective content items in the remote collection. For example, the placeholders can be labeled based on the names of the respective content items in the remote collection and can be encoded with the addresses of the respective content items so that the respective content items (and the associated data) can be accessed from the placeholders.

The collection created and stored on content management system 110 can be linked to the remote collection. By linking the collection on content management system 110 to the remote collection, content management system 110 can synchronize the collection on content management system 110 with the remote collection and ensure that any changes/updates to the remote collection (and/or content items in the remote collection) are propagated to the collection on content management system 110. In some examples, by linking the collection on content management system 110 to the remote collection in order to synchronize the collection on content management system 110 with the remote collection, content management system 110 can also ensure that any changes/updates to the collection (and/or placeholders in the collection) stored on content management system 110 are propagated to the remote collection (and/or the content items in the remote collection). Thus, in some examples, synchronization between the collection on content management system 110 and the remote collection on the third-party content management system can be bi-directional (e.g., from the third-party content management system to content management system 110, and vice versa).

Moreover, the collection created and stored on content management system 110 can be viewed and/or accessed through interface 400. In some examples, the interface 400 can present each collection created from, and linked to, a remote collection along with (or in association with) an interface element that indicates that such collection presented by interface 400 is linked to a remote collection. For example, interface 400 can present such collection with an icon, label, or any other graphical element to distinguish such collection from a regular collection that is not linked to a remote collection, and to inform the user that such collection is linked to a remote collection on a third-party content management system. In some cases, the interface element presented by interface 400 with such collection can identify the particular third-party content management system and/or remote collection associated with that collection in content management system 110. In some examples, the way or configuration in which a collection created from, and linked to, a remote collection is depicted can be different from that of other types of content items and can visually distinguish such collections as being linked to remote collections. For example, the font size, type and/or color of the name displayed for such collections can be different than the font size, type, and/or color of the name displayed for other types of content items in order to distinguish such collections from other content items.

Figure 5A:
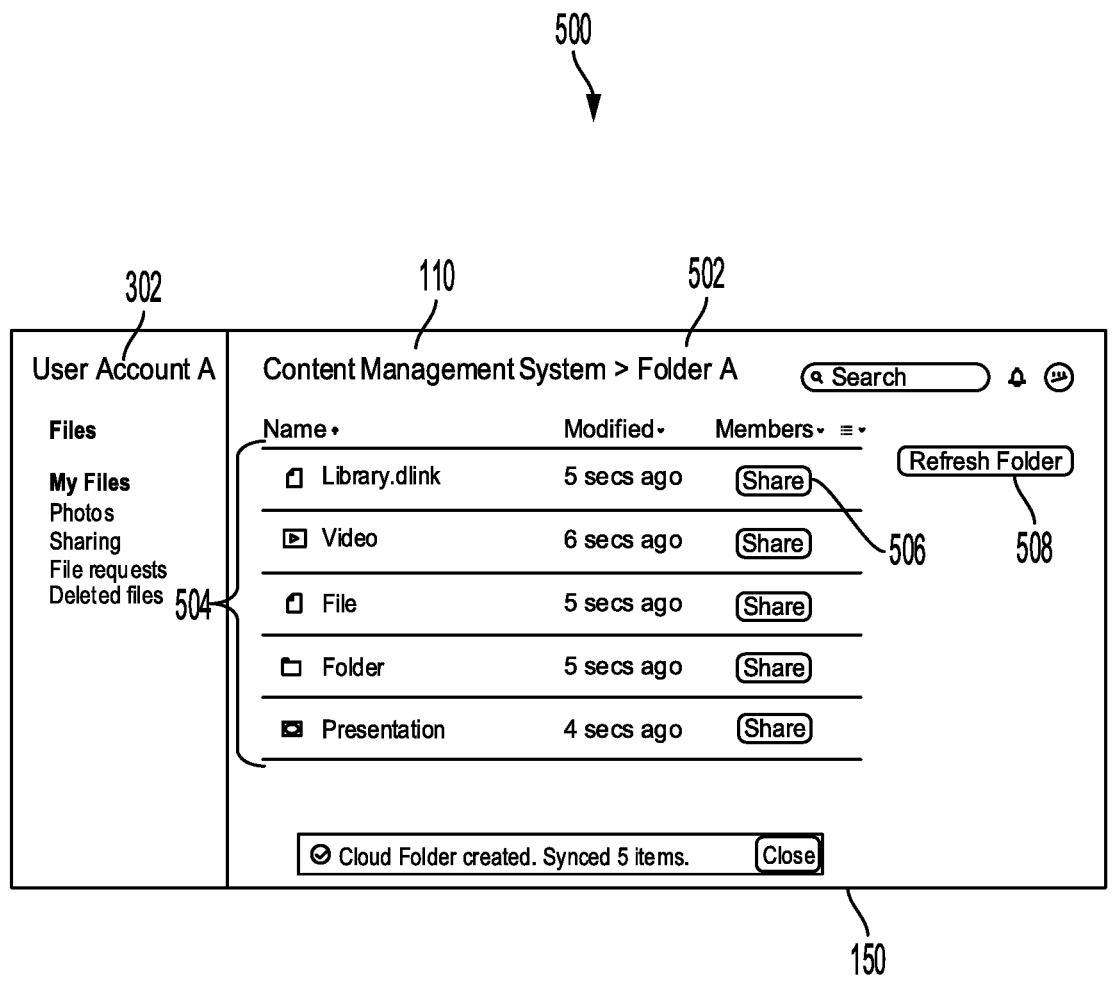
FIG. 5A shows an example interface depicting a collection created and stored on a content management system based on a remote collection on a third-party content management system, according to some examples.

FIG. 5A shows example interface 500 depicting collection 502 created and stored on content management system 110 based on a remote collection (e.g., remote collection 318) on a third-party content management system (e.g., third-party content management system 202).

A user can access interface 500 from client device 150 via user account 302. In this example, interface 500 depicts placeholders 504 contained in collection 502 on content management system 110. Each placeholder corresponds to a content item in the remote collection linked to collection 502. Each placeholder can be encoded with a link, path, or address associated with the content item it corresponds to. Thus, when a user selects or activates the placeholder from client device 150, client device 150 can extract the link, path, or address encoded in the placeholder, and use the link, path, or address to access the data contents of the content item associated with the placeholder (e.g., the corresponding content item in the remote collection stored on the third-party content management system).

In some examples, when the user selects or activates the placeholder, the placeholder can redirect (e.g., using the link, path or address encoded in the placeholder) client device 150 to the content item associated with the placeholder. Client device 150 can then render/display the content item (e.g., the data contents of the content item) from the link, path or address of the content item, which is encoded in the placeholder as previously explained. In other examples, when the user selects or activates the placeholder, client device 150 can use the link, path or address encoded in the placeholder to retrieve, from the third-party content management system, the data contents of the content item associated with the placeholder. Client device 150 can then render/present the data contents of the content item for the user.

Placeholders 504 can appear or be depicted as the type of content item they are linked to (e.g., the content items in the remote collection). For example, a placeholder linked to a .jpg file in the remote collection can represent the .jpg file and can appear or be depicted as a .jpg file. Thus, to the user, the placeholder can appear as a .jpg file in collection 502 despite the placeholder not being a .jpg file or including the image data from the corresponding .jpg file in the remote collection. In some cases, placeholders 504 can instead appear or be depicted as link files, such as URL or WEBLOC files.

Moreover, in some examples, interface 500 can render/present previews for placeholders 504. For example, when performs a preview triggering action for a particular placeholder, interface 500 can present a preview generated by content management system 110 for that placeholder. The preview triggering action can include, for example, hovering over the particular placeholder using an input device, clicking on the particular placeholder a certain number of times or with a certain input device button configured to trigger a preview, etc. The preview can be, for example, a thumbnail, an image, or rendering of at least a portion of the data contents of the content item associated with the particular placeholder (e.g., the content item in the remote collection corresponding to the particular placeholder).

Content management system 110 can generate such previews based on data received by content management system 110 from the third-party content management system storing the content items associated with placeholders 504. For example, cloud integration service 220 can obtain, from the third-party content management system, metadata for the content items corresponding to placeholders 504, which content management system 110 can use to generate previews for placeholders 504.

In some cases, interface 500 can include share options 506 for placeholders 504. Share options 506 can be used to share placeholders 504 with other user accounts on content management system 110. For example, interface 500 can present a share option for a particular placeholder, which a user can use to share that particular placeholder with one or more user accounts. When the user activates (e.g., selects, clicks, etc.) the share option, the user can be presented an option to define one or more user accounts to share the particular placeholder with.

In some cases, content management system 110 can set access permissions for collection 502 and/or placeholders 504. For example, content management system 110 can set access permissions for collection 502 and/or placeholders 504 based on one or more access permissions defined for collection 502 and/or placeholders 504 by user account 302 and/or based on one or more access permissions inherited by collection 502 and/or placeholders 504 from a parent content item, such as a parent folder or directory. In some cases, content management system 110 can also calculate access permissions for collection 502 and/or placeholders 504 based on any access permissions configured for the associated remote collection and/or content items on the third-party content management system. For example, content management system 110 can obtain from the third-party content management system metadata identifying any access permissions set on the third-party content management system for the remote collection and/or associated content items. Content management system 110 can then apply such access permissions to collection 502 and/or placeholders 504, or use such access permissions to calculate one or more access permissions for collection 502 and/or placeholders 504 based on a combination of the access permissions from the third-party content management system and any applicable access permissions from content management system 110.

In some examples, when sharing collection 502 and/or a placeholder in collection 502 with one or more user accounts, content management system 110 can contact the third-party content management system to request that the one or more user accounts be given certain access permissions to the remote collection on third-party content management system associated with collection 502 and/or a content item in the remote collection corresponding to the placeholder in collection 502. For example, when user account 302 shared a placeholder in collection 502 with user account N (e.g., via a sharing option associated with the placeholder), content management system 110 can contact the third-party content management system to request that user account N be given a certain level of access to the content item in the remote collection that corresponds to the placeholder being shared. The third-party content management system can then provide such level of access to user account N so user account N can have access to the placeholder and/or the content item associated with the placeholder, and to ensure that the placeholder stored in association with user account N is kept synchronized with the content item associated with the placeholder.

As previously mentioned, collection 502 can be synchronized (e.g., via cloud integration service 220) with the remote collection that collection 502 is linked to, in order to ensure that the contents of collection 502 (e.g., placeholders 504) remain consistent with the contents of the remote collection even after any modifications are made to the remote collection and/or the content items in the remote collection. In some examples, content management system 110 can synchronize collection 502 with the remote collection periodically (e.g., at certain intervals of time, upon certain events, etc.) and/or automatically anytime a change is made to the remote collection and/or collection 502. For example, if the remote collection on the third-party content management system is modified, the third-party content management system can push/send an indication of the change to content management system 110, which content management system 110 can use to update/synchronize collection 502. As another example, if the remote collection on the third-party content management system is modified, the third-party content management system can notify content management system 110 of the change, and such notification can trigger the synchronization of collection 502 with the remote collection on the third-party content management system in order to update collection 502 to reflect the modification. In some cases, interface 500 can additionally or alternatively display refresh option 508 to allow a user to manually trigger a synchronization between collection 502 and the remote collection. A user can thus activate refresh option 508 to trigger such synchronization between the remote collection and collection 502.

Figure 5B:
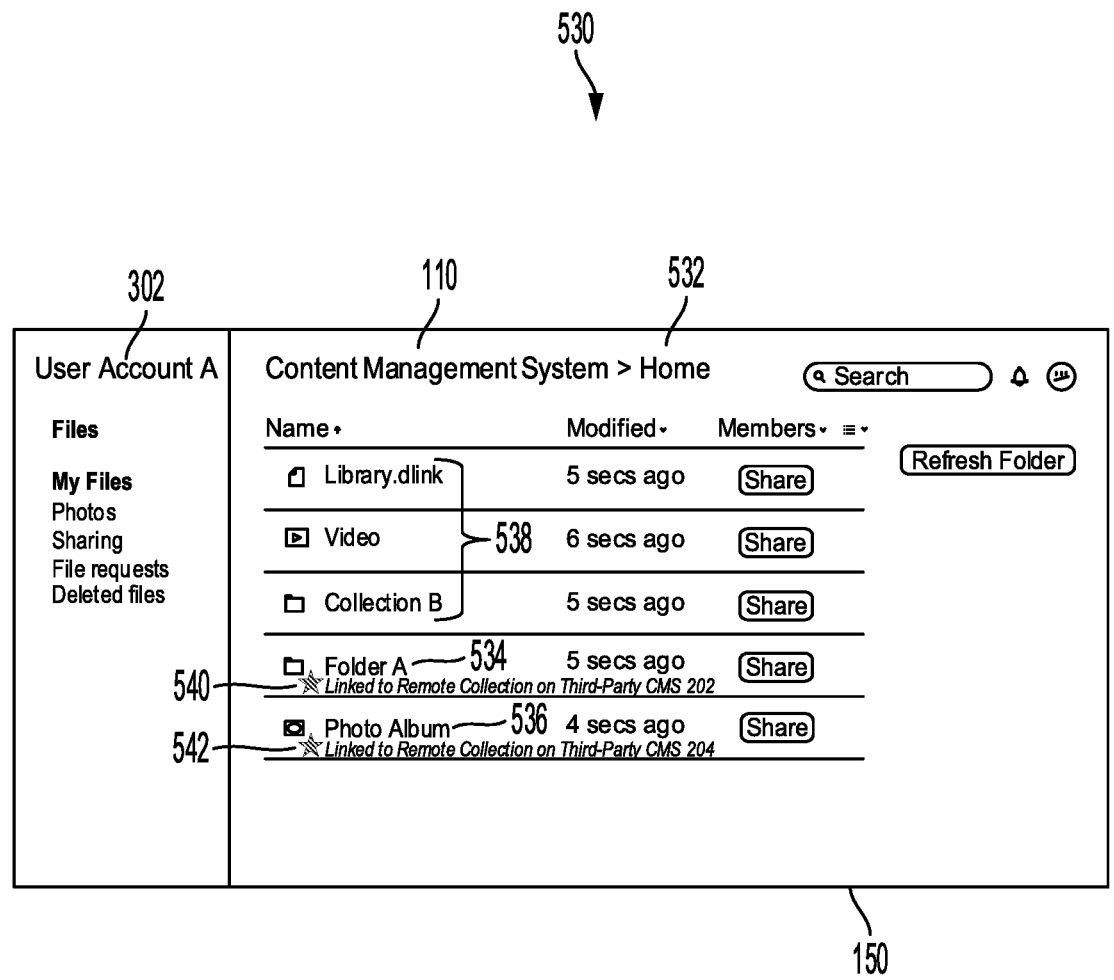
FIG. 5B shows an example interface depicting a user's home folder on a content management system storing content items that are not linked to remote collections, along with collections created, linked and stored on the content management system based on remote collections on third-party content management systems, according to some examples.

FIG. 5B shows example interface 530 depicting a user's home folder 532 on content management system 110 storing content items 538, which are not linked to any remote collections, along with collections 534 and 536 created, linked and stored on content management system 110 based on remote collections on third-party content management systems 202 and 204, respectively.

A user can access interface 530 from client device 150 via user account 302. In this example, interface 530 depicts home folder 532 of user account 302. Home folder 532 can be the root or top level directory, folder, namespace, collection, or storage space of user account 302 on content management system 110, and can contain the content items stored for user account 302 on content management system 110.

In this example, as depicted by interface 530, home folder 532 includes content items 538 and collections 534 and 536. Content items 538 are content items stored on content management system 110 that are not linked to remote collections stored on third-party content management systems. Content items 538 can include any type of content item such as, for example and without limitation, a collection, a link, a video/audio file, a photo album, a folder, a directory, a project file, a library, an image, a document, etc.

Collections 534 and 536 represent collections stored on content management system 110 that are created from, and linked to, remote collections on third-party content management systems. To identify collections 534 and 536 as being associated with (e.g., linked to) remote collections on third-party content management systems, interface 530 can display interface elements 540 and 542 along with collections 534 and 536. Interface elements 540 and 542 can indicate that collections 534 and 536 are collections created from, and linked to, remote collections on third-party content management systems. In some examples, interface elements 540 and 542 can also identify which third-party content management system(s) collections 534 and 536 are linked to. For example, interface elements 540 and 542 can include text indicating that collections 534 and 536 are linked to remote collections on third-party content management systems 202 and 204, respectively. In other examples, interface elements 540 and 542 can include an address, such as a uniform resource locator (URL), to each of the remote collections and/or third-party content management systems that collections 534 and 536 are linked to.

Interface elements 540 and 542 can include, for example and without limitation, icons, thumbnails, labels, tags, text, metadata, links, flags, and/or any other graphical element, object, or content. In some cases, the configuration (e.g., appearance, type, size, shape, content, etc.) of interface elements 540 and 542 can vary based on the type of remote collections that collections 534 and 536 are linked to, the specific third-party content management system storing such remote collections, user preferences, and/or any other factor. For example, in some cases, different icons, thumbnails, tags, graphical elements, etc., can be used in connection with different types of remote collections and/or third-party content management systems.

Figure 6A:
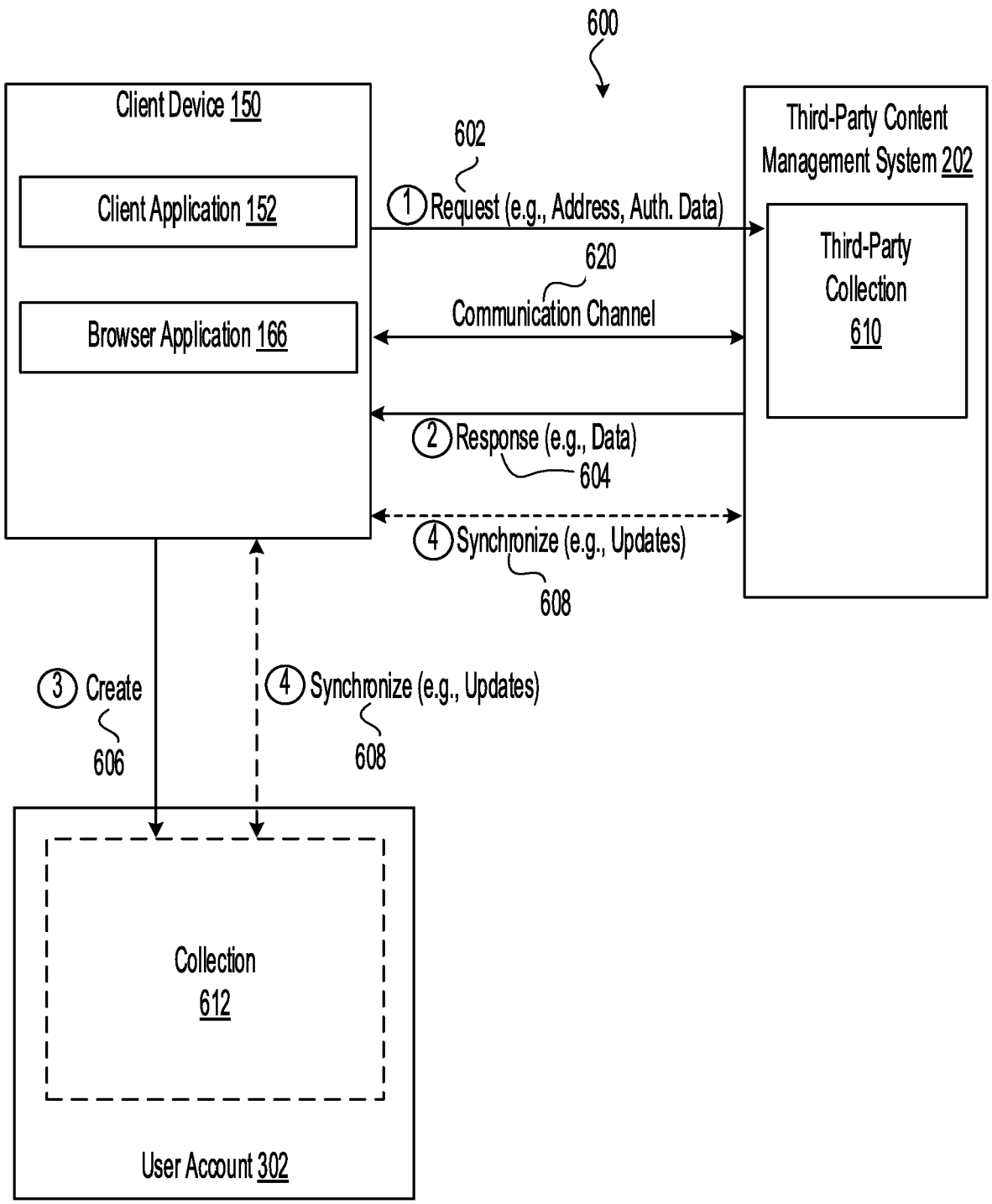
FIG. 6A shows an example process for creating, storing, and managing a collection linked to a third-party collection on a third-party content management system, according to some examples.

FIG. 6A shows an example process 600 for creating, storing, and managing collection 612 linked to third-party collection 610 on third-party content management system 202. In this example, client device 150 can initiate process 600 to trigger the creation of collection 612 and the storage of collection 612 in association with user account 302. When created, collection 612 can, in some embodiments, be stored on both client device 150 and content management system 110, in association with user account 302. Moreover, the copies of collection 612 stored on client device 150 and content management system 110 can be synchronized to mirror each other, as previously explained.

As shown, client device 150 can first send (e.g., via client application 152 or browser application 166), to third-party content management system 202, request 602 for information about third-party collection 610. The information requested can include, for example and without limitation, a name of third-party collection 610, a list of content items contained in third-party collection 610, the addresses of the content items contained in third-party collection 610, metadata (e.g., access permissions, collaboration data such as comments, preview data, an indication of the content item types of the content items contained in third-party collection 610, content item hierarchies, tags, content item sizes, timestamps, etc.), metadata associated with third-party collection 610, and/or any other information about third-party collection 610 and/or the content items in third-party collection 610.

Request 602 can include an address of third-party collection 610 which can be used to retrieve and/or identify third-party collection 610. In some cases, request 602 can include other information such as, for example, a unique identifier associated with third-party collection 610, authentication information, such as an authentication token, user account information, etc. In some examples, such authentication information can include an authentication token and/or any other authentication credentials for establishing a communication channel between client device 150 and third-party content management system 202, establishing that client device 150 (and/or user account 302) is authorized to access third-party collection 610, and/or providing third-party content management system 202 authentication information that third-party content management system 202 can use to authenticate itself when communicating with user account 302 and/or client device 150 and/or when providing data (e.g., data contents, metadata, updates, etc.) to client device 150.

In some examples, client device 150 and third-party content management system 202 can use information in request 602 to establish communication channel 620 between client device 150 and third-party content management system 202. For example, client device 150 and third-party content management system 202 can use authentication information in request 602, such as an authentication token or authentication credentials, to establish communication channel 620 between client device 150 and third-party content management system 202.

Communication channel 620 can be a communication and/or network connection/link that client device 150 and third-party content management system 202 can use to communicate either synchronously or asynchronously. For example, communication channel 620 can be, without limitation, an API link or connection, a network connection based on one or more networking protocols (e.g., TCP/IP, SSH, HTTPS, etc.), a network tunnel or route, etc. Moreover, while communication channel 620 can provide a persistent or continuous channel or connection between client device 150 and third-party content management system 202, such as an open session, it should be noted that communication channel does not have to be a continuous or persistent channel or connection.

Third-party content management system 202 can send response 604 to client device 150 based on request 602. In some examples, third-party content management system 202 can send response 604 to client device 150 through communication channel 620. In other examples, response 604 can include authentication information, such as an authentication token or authentication credentials, which can be used by client device 150 and third-party content management system 202 to establish communication channel 620 for any subsequent communications between client device 150 and third-party content management system 202.

Response 604 can include the requested information about third-party collection 610 previously described. For example, response 604 can include a list of content items contained in third-party collection 610 and the addresses of such content items. Client device 150 can use the information in response 604 to create 606 collection 612 on client device 150. When creating collection 612, client device 150 can store collection 612 in association with user account 302. User account 302 can be an account on content management system 110 used to send/issue request 602. Client device 150 can use user account 302 to synchronize collection 612 with content management system 110 so that collection 612 is also created and stored in content management system 110 (in association with user account 302).

Moreover, when creating collection 612, client device 150 can create a placeholder for each content item in third-party collection 610. Thus, the contents of collection 612 can mirror the contents of third-party collection 610, except that the contents of collection 612 include placeholders referencing the content items in third-party collection 610 as opposed to copies of the content items and associated data contents in third-party collection 610. However, in some cases, to a user, the contents of collection 612 can appear the same as, or can resemble, the contents of third-party collection 610.

The placeholders in collection 612 can include the addresses of their corresponding content items in third-party collection 610. Client device 150 can obtain the addresses of the content items in third-party collection 610 from response 604, and use the addresses to create the placeholders in collection 612. Moreover, collection 612 can be linked to third-party collection 610 and can represent third-party collection 610, as previously described. By linking collection 612 to third-party collection 610, client device 150 can ensure that collection 612 is synchronized, and/or maintained synchronized, with third-party collection 610. For example, in some cases, anytime third-party collection 610 is modified at third-party content management system 202, client device 150 can synchronize 608 (e.g., via client application 152 and/or content management system 110) collection 612 with third-party collection 610. This way, collection 612 (and it the placeholders contained in collection 612) can be kept synchronized with third-party collection 610 (and the content items in third-party collection 610).

For example, if a content item in third-party collection 610 is added, removed, modified, etc., client device 150 can synchronize (e.g., via client application 152 and/or content management system 110) collection 612 with third-party collection 610 to reflect the addition, removal, modification, etc., of the content item in third-party collection 610. In this example, client device 150 can receive (e.g., via client application 152, content management system 110, and/or third-party content management system 202) synchronization information from third-party content management system 202 identifying the current state of third-party collection 610 and/or the change to third-party collection 610, which client device 150 can use to update collection 610. Client device 150 can update collection 610 by adding, removing, modifying, etc., a placeholder in collection 610 corresponding to the content item in third-party collection 610 that was added, removed, modified, etc.

In some examples, client device 150 can synchronize 608 collection 612 with third-party collection 610 using communication channel 620. Moreover, to synchronize 608 collection 612 and third-party collection 610, client device 150 can poll or query third-party content management system 202 for any changes/updates to third-party collection 610 (and the content items in third-party collection 610), and/or third-party content management system 202 can notify client device 150 (e.g., via client application 152 and/or content management system 110) when third-party collection 610 (and any of the content items in third-party collection 610) has been modified/updated. Client device 150 can use any information received regarding changes/updates to third-party collection 610 (and/or the content items in third-party collection 610) to update collection 612 (and/or any placeholders in collection 612) accordingly.

In some cases, when synchronizing collection 612 with third-party collection 610, client device 150 can retrieve or receive from third-party content management system 202 any updates to third-party collection 610. Client device 150 can then apply such updates to collection 612 to ensure that collection 612 is synchronized with third-party collection 610. In some examples, when retrieving any updates from third-party content management system 202, client device 150 can provide to third-party content management system 202 authentication information to prove that client device 150 (and/or user account 302) is authorized to access third-party collection 610 and/or retrieve such updates. Similarly, in some examples, when providing any updates to client device 150, third-party content management system 202 can provide authentication information (such as some or all of the authentication information in request 602) to client device 150 to establish a communication channel with client device 150 and/or prove that third-party content management system 202 is authorized to provide such updates for collection 612.

In some cases, when synchronizing collection 612 with third-party collection 610, client device 150 can send to third-party content management system 202 any changes made to collection 612. Third-party content management system 202 can then apply such updates to third-party collection 610 to ensure that third-party collection 610 is synchronized with collection 612. In some examples, when sending any updates to third-party content management system 202, client device 150 can include authentication information to establish a communication channel with third-party content management system 202 and/or establish that content management system 110 is authorized to update third-party collection 610.

Moreover, in some examples, client device 150 can share collection 612 and/or any placeholders in collection 612 with one or more user accounts. When sharing collection 612 and/or a placeholder in collection 612 with a user account, client device 150 can contact (e.g., via client application 152 and/or content management system 110) third-party content management system 202 to request that the user account be given certain access permissions to third-party collection 610 and/or a content item in third-party collection 610 corresponding to the placeholder in collection 612 being shared. For example, if user account 302 shares collection 612 with user account N, client device 150 can contact (e.g., via client application 152 and/or content management system 110) third-party content management system 202 to request that user account N be given a certain level of access to third-party collection 610, which is linked and corresponds to collection 612. Third-party content management system 202 can receive the request and provide such level of access to user account N so that user account N can have access to third-party collection 610, and to ensure that collection 612 stored in association with user account N is kept synchronized with third-party collection 612.

Figure 6B:
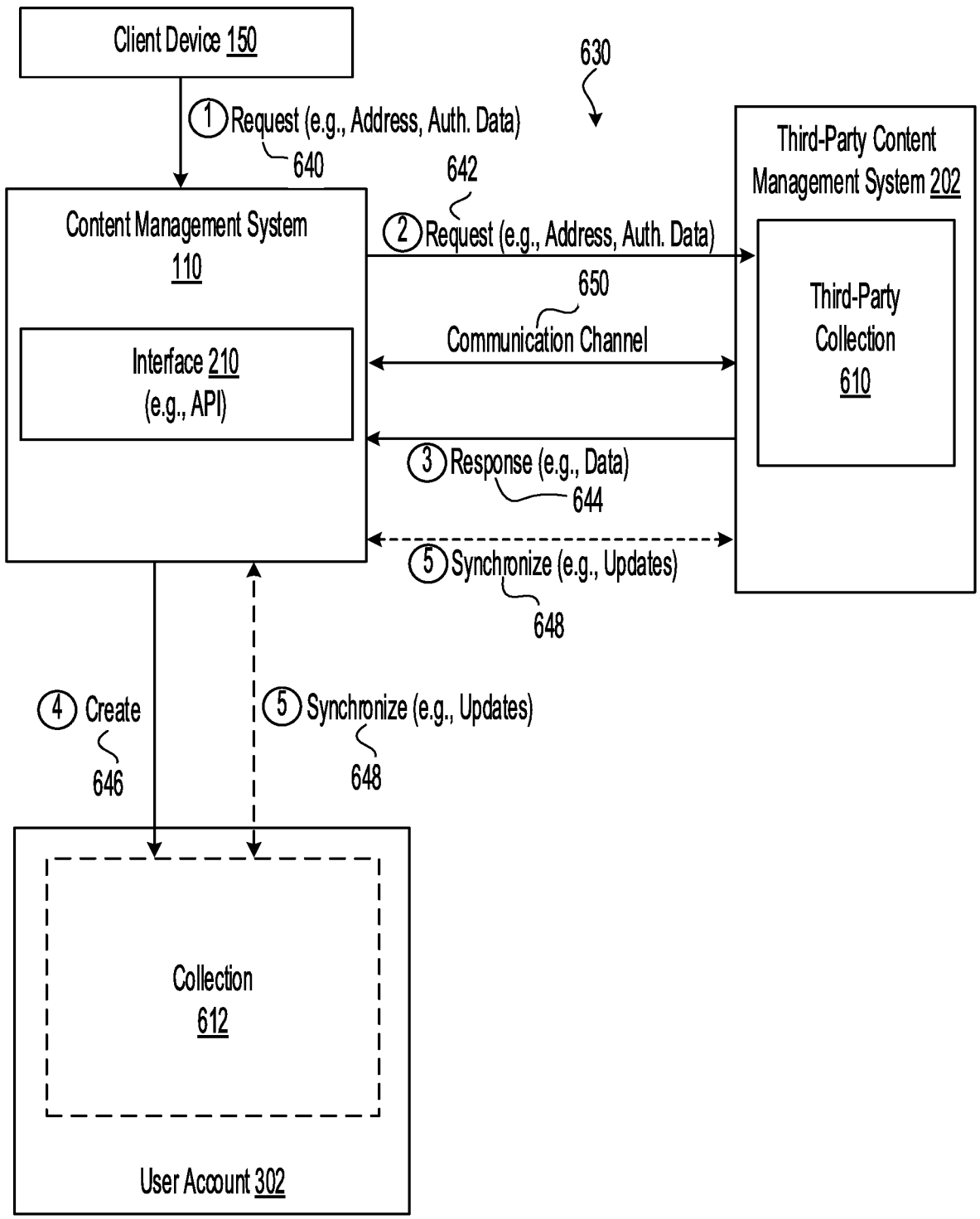
FIG. 6B shows another example process for creating, storing, and managing a collection linked to a third-party collection on a third-party content management system, according to some examples.

FIG. 6B shows another example process 630 for creating, storing, and managing collection 612 linked to third-party collection 610 on third-party content management system 202. In this example, client device 150 can initiate process 630, but content management system 110 can perform various portions of process 630 to create and store collection 612 on content management system 110. When created, collection 612 can, in some embodiments, be stored on both client device 150 and content management system 110, in association with user account 302. Moreover, the copies of collection 612 stored on client device 150 and content management system 110 can be synchronized to mirror each other, as previously explained.

As shown, client device 150 can first send (e.g., via client application 152 or browser application 166) request 640 to content management system 110. Request 640 can be a request to create and store collection 612 on content management system 110 and client device 150. Request 640 can include a name of third-party collection 610 and an address of third-party collection 610. In some cases, request 640 can include other information such as, for example, a unique identifier of third-party collection 610, user account credentials, an authentication token, and/or any other information associated with client device 150, user account 302, and/or third-party collection 610.

Content management system 110 can receive request 640 and generate request 642 for information about third-party collection 610. Content management system 110 can send request 642 to third-party content management system 202. The information requested in request 642 can include, for example and without limitation, the name of third-party collection 610, a list of content items contained in third-party collection 610, the addresses of the content items contained in third-party collection 610, metadata (e.g., access permissions, collaboration data such as comments, preview data, an indication of the content item types of the content items contained in third-party collection 610, content item hierarchies, tags, content item sizes, timestamps, etc.), metadata associated with third-party collection 610, and/or any other information about third-party collection 610 and/or the content items in third-party collection 610.

Request 642 can include an address of third-party collection 610, which can be used to retrieve and/or identify third-party collection 610. In some cases, request 642 can include other information such as, for example, a unique identifier associated with third-party collection 610, authentication information, such as an authentication token, user account information, etc. In some examples, such authentication information can include an authentication token and/ or any other authentication credentials for establishing a communication channel between content management system 110 and third-party content management system 202, establishing that content management system 110 (and/or the requesting user account on content management system 110) is authorized to access third-party collection 610, and/or providing third-party content management system 202 authentication information that third-party content management system 202 can use to authenticate itself with content management system 110 when communicating with content management system 110 and/or providing data (e.g., data contents, metadata, updates, etc.) to content management system 110.

In some examples, content management system 110 and third-party content management system 202 can use information in request 642 to establish communication channel 650 between content management system 110 and third-party content management system 202. For example, content management system 110 and third-party content management system 202 can use authentication information in request 642, such as an authentication token or authentication credentials, to establish communication channel 650 between content management system 110 and third-party content management system 202. Moreover, in some cases, content management system 110 and third-party content management system 202 can establish communication channel 650 via interface 210.

Communication channel 650 can be a communication and/or network connection/link that content management system 110 and third-party content management system 202 can use to communicate either synchronously or asynchronously. For example, communication channel 650 can be, without limitation, an API link or connection, a network connection based on one or more networking protocols (e.g., TCP/IP, SSH, HTTPS, etc.), a network tunnel or route, etc. Moreover, while communication channel 650 can provide a persistent or continuous channel or connection between content management system 110 and third-party content management system 202, such as an open session, it should be noted that communication channel 650 does not have to be a continuous or persistent channel or connection.

Third-party content management system 202 can send response 644 to content management system 110 based on request 642. In some examples, third-party content management system 202 can send response 644 to content management system 110 through communication channel 650. In other examples, response 604 can include authentication information, such as an authentication token or authentication credentials, which can be used by content management system 110 and third-party content management system 202 to establish communication channel 650 for any subsequent communications between content management system 110 and third-party content management system 202.

Response 644 can include the requested information about third-party collection 610 previously described. For example, response 644 can include a list of content items contained in third-party collection 610 and the addresses of such content items. Content management system 110 can use the information in response 644 to create 646 collection 612 on content management system 110. When creating collection 612, content management system 110 can store collection 612 in association with user account 302. Content management system 110 can also synchronize collection 612 with client device 150, to store a local version of collection 612 on client device 150. Client device 150 can store the local version of collection 612 in association with user account 302.

Moreover, when creating collection 612, content management system 110 can create a placeholder for each content item in third-party collection 610. Thus, the contents of collection 612 can mirror the contents of third-party collection 610, except the contents of collection 612 include placeholders referencing the content items in third-party collection 610 as opposed to copies of the content items and associated data contents. However, in some cases, to a user, the contents of collection 612 can appear the same as, or can resemble, the contents of third-party collection 610.

The placeholders in collection 612 can include the addresses of their corresponding content items in third-party collection 610. Content management system 110 can obtain the addresses of the content items in third-party collection 610 from response 644, and use the addresses to create the placeholders in collection 612. Moreover, collection 612 can be linked to third-party collection 610 and can represent third-party collection 610, as previously described. By linking collection 612 to third-party collection 610, content management system 110 can ensure that collection 612 is synchronized, and/or maintained synchronized, with third-party collection 610. Thus, in some cases, anytime third-party collection 610 is modified at third-party content management system 202, content management system 110 can synchronize 648 (e.g., via interface 210) collection 612 with third-party collection 610. This way, collection 612 (and the placeholders contained in collection 612) can be kept synchronized with third-party collection 610 (and the content items in third-party collection 610).

For example, if a content item in third-party collection 610 is added, removed, modified, etc., content management system 110 can synchronize collection 612 with third-party collection 610 to reflect the addition, removal, modification, etc., of the content item in third-party collection 610. In this example, content management system 110 can receive synchronization information from third-party content management system 202 identifying the current state of third-party collection 610 and/or the change to third-party collection 610, which content management system 110 can use to update collection 610. Content management system 110 can update collection 610 by adding, removing, modifying, etc., a placeholder in collection 610 corresponding to the content item in third-party collection 610 that was added, removed, modified, etc.

In some examples, content management system 110 can synchronize 648 collection 612 with third-party collection 610 using communication channel 650. Moreover, to synchronize 648 collection 612 and third-party collection 610, content management system 110 can poll or query third-party content management system 202 for any changes/updates to third-party collection 610 (and the content items in third-party collection 610), and/or third-party content management system 202 can notify content management system 110 when third-party collection 610 (and any of the content items in third-party collection 610) has been modified/updated. Content management system 110 can use any information received regarding changes/updates to third-party collection 610 (and/or the content items in third-party collection 610) to update collection 612 (and/or any placeholders in collection 612) accordingly.

In some cases, when synchronizing collection 612 with third-party collection 610, content management system 110 can retrieve or receive from third-party content management system 202 any updates to third-party collection 610. Content management system 110 can then apply such updates to collection 612 to ensure that collection 612 is synchronized with third-party collection 610. In some examples, when retrieving any updates from third-party content management system 202, content management system 110 can provide to third-party content management system 202 authentication information to prove that content management system 110 (and/or user account 302) is authorized to access third-party collection 610 and/or retrieve such updates. Similarly, in some examples, when providing any updates from to content management system 110, third-party content management system 202 can provide authentication information (such as some or all of the authentication information in request 602) to content management system 110, to establish a communication channel with content management system 110 and/or prove that third-party content management system 202 is authorized to provide such updates for collection 612.

In some cases, when synchronizing collection 612 with third-party collection 610, content management system 110 can send to third-party content management system 202 any changes made to collection 612. Third-party content management system 202 can then apply such updates to third-party collection 610 to ensure that third-party collection 610 is synchronized with collection 612. In some examples, when sending any updates to third-party content management system 202, content management system 110 can include authentication information to establish a communication channel with third-party content management system 202 and/or establish that content management system 110 is authorized to update third-party collection 610.

Moreover, in some examples, content management system 110 can share collection 612 and/or any placeholders in collection 612 with one or more user accounts. When sharing collection 612 and/or a placeholder in collection 612 with a user account, content management system 110 can contact third-party content management system 202 to request that the user account be given certain access permissions to third-party collection 610 and/or a content item in third-party collection 610 corresponding to the placeholder being shared from collection 612. For example, if user account 302 shares collection 612 with user account N, content management system 110 can contact third-party content management system 202 to request that user account N be given a certain level of access to third-party collection 610, which is linked and corresponds to collection 612. Third-party content management system 202 can receive the request and provide such level of access to user account N so that user account N can have access to third-party collection 610, and to ensure that collection 610 stored in association with user account N is kept synchronized with third-party collection 610.

Figure 7:
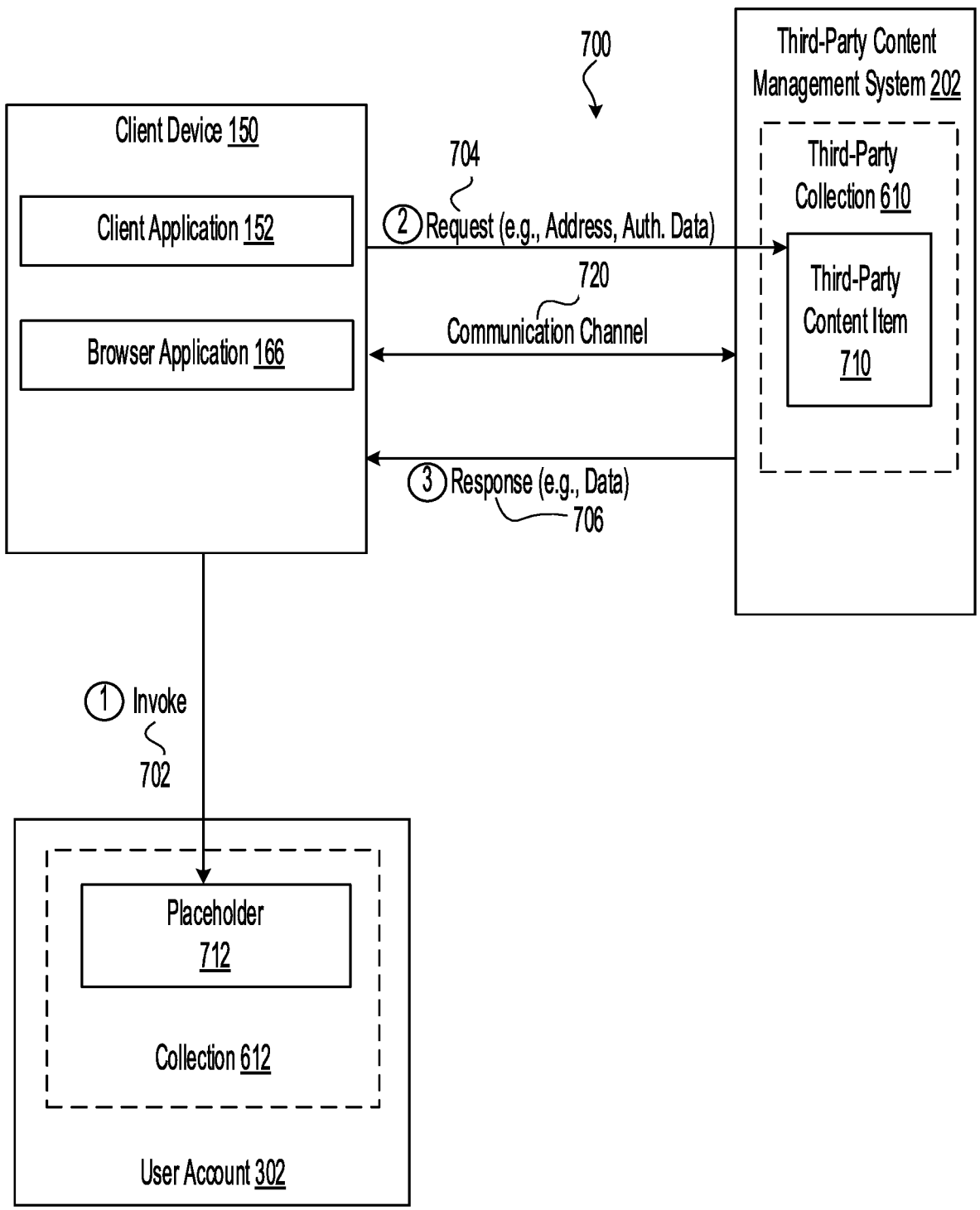
FIG. 7 shows an example process for providing a client device access to the content of a third-party content item through a placeholder in a collection stored on a content management system, according to some examples.

FIG. 7 shows an example process 700 for providing client device 150 access to the content of third-party content item 710 through placeholder 712 in collection 612. In this example, third-party content item 710 and its data contents are stored on third-party content management system 202. Moreover, a synchronized copy of placeholder 712 and collection 612 can be stored on client device 150 and content management system 110 in association with user account 302. Thus, client device 150 can access placeholder 712 from local storage client device 150 and/or from content management system 110.

Client device 150 can access placeholder 712 and the content of third-party content item 710 via client application 152 or browser application 166. In process 700, client device 150 first invokes 702 (e.g., via client application 152 or browser application 166) placeholder 712 in collection 612. Client device 150 can invoke 702 a local copy of placeholder 712 stored on client device 150 or a remote copy stored on content management system 110. In some examples, client device 150 can invoke 702 placeholder 712 by clicking on placeholder 712, selecting placeholder 712, trying to access placeholder 712, or generating an instruction to activate or invoke placeholder 712.

When client device 150 invokes placeholder 712, an address of third-party content item 710 encoded in placeholder 712 can trigger request 704 from client device 150 to third-party content management system 202, requesting access to third-party content item 710 (and/or its data contents). Request 704 can include the address of third-party content item 710. In some examples, request 704 can also include authentication information (e.g., an authentication token, credentials, etc.) for verifying access to third-party content item 710. The authentication information can be used to establish communication channel 720 between client device 150 and third-party content management system 202 and use the communication channel to retrieve third-party content item 710 (and/or its data contents). Moreover, in some cases, request 704 can include other information such as, for example, a unique identifier associated with third-party content item 710, metadata, etc.

Third-party content management system 202 can receive request 704 and send response 706 to client device 150, which client device 150 can use to render/present (e.g., via client application 152 or browser application 166) third-party content item 710 and its data contents. Response 706 can include the data contents of third-party content item 710 and/or a rendering of the data contents of third-party content item 710. In some examples, response 706 can also include other information such as, for example, metadata (e.g., a comment, a title, a timestamp, a tag, information about third-party content item 710, etc.) associated with third-party content item 710, a unique identifier associated with third-party content item 710, authentication information, etc.

In some examples, third-party content management system 202 can receive request 704 and/or send response 706 via communication channel 720. In such examples, third-party content management system 202 and client device 150 can establish communication channel 720 based on authentication information, such as an authentication token or authentication credentials, included in request 704, response 706, and/or a previous communication exchange during the creation of collection 612. In other examples, communication channel 720 can be established prior to request 704, when collection 612 was created as previously described.

Figure 8:
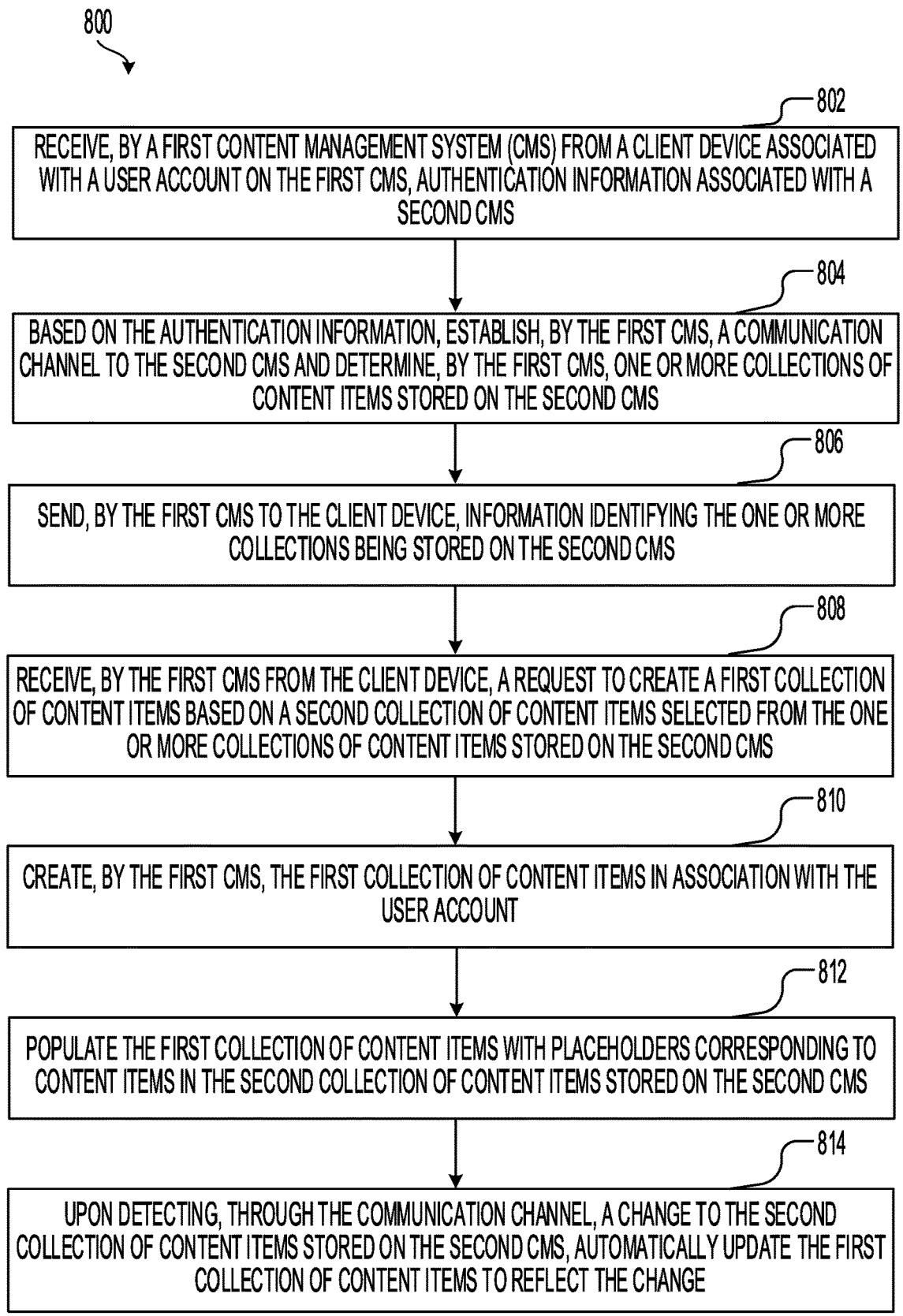
FIG. 8 shows an example method for synchronizing content items and collections of content items across content management systems, according to some examples.

Having disclosed example system components and concepts, the disclosure now turns to example method 800 for synchronizing content items and collections of content items across content management systems, as shown in FIG. 8. The steps outlined herein are non-limiting examples provided for illustration purposes, and can be implemented in any combination thereof, including combinations that exclude, add, or modify certain steps.

At step 802, method 800 can include receiving, by content management system 110 from client device 150 associated with a user account (e.g., 302) on Content management system 110, authentication information associated with third-party content management system 202. The authentication information can include, for example, an authentication token, authentication credentials, and/or any other type of authentication information. In some examples, the authentication information can correspond to a user account registered in content management system 110 and/or third-party content management system 202. For example, in some cases, the authentication information can correspond to user account 302 on content management system 110. In another example, the authentication information can correspond to a user account on third-party content management system 202. To illustrate, in some cases, a user may have a user account on content management system 110 and another user account on third-party content management system 202. Here, the user can provide content management system 110 authentication information (e.g., credentials, etc.) corresponding to the user's account on third-party content management system 202.

At step 804, method 800 can include establishing, by content management system 110, a communication channel (e.g., 620 or 650) to third-party content management system 202 based on the authentication information and determining, by content management system 110, one or more collections of content items stored on third-party content management system 202. In some cases, the communication channel can include, for example and without limitation, an API link or connection and/or a network connection established using one or more networking protocols (e.g., TCP/IP, SSH, HTTPS, etc.).

At step 806, method 800 can include sending, by content management system 110 to client device 150, information identifying the one or more collections stored on third-party content management system 202. In some cases, content management system 110 can send to client device 150 one or more addresses corresponding to the one or more collections stored on third-party content management system 202 and/or a list (and/or metadata) identifying the one or more collections (and/or one or more content items in the one or more collections). In some cases, content management system 110 can provide (e.g., via the communication channel), a graphical user interface (e.g., 300 or 400) identifying the one or more collections of content items stored on third-party content management system 202.

In some examples, the graphical user interface can display the one or more collections of content items stored on third-party content management system 202. For example, content management system 110 can obtain a respective address of each of the one or more collections of content items on third-party content management system 202, and use the respective address to retrieve a list of the one or more collections of content items and present the one or more collections of content items on the graphical user interface for the user to select any of the one or more collections of content items to be created on content management system 110 as described herein.

At step 808, method 800 can include receiving, by content management system 110 from client device 150, a request (e.g., 640) to create a first collection of content items (e.g., collection 612) based on a second collection of content items (e.g., third-party collection 610) selected from the one or more collections of content items stored on third-party content management system 202. In some examples, content management system 110 can receive, from client device 150, a request to create a first collection of content items based on a second collection of content items selected by user account 302 from the graphical user interface previously described. The second collection of content items selected from the graphical user interface can be a third-party collection stored on third-party content management system 202.

In some cases, the request can include an address associated with the second collection of content items on third-party content management system 202. Moreover, in some cases, the request can also include other information such as, for example, authentication information, a unique identifier associated with the second collection of content items, etc.

At step 810, method 800 can include creating, by content management system 110, the first collection of content items in association with user account 302. In some cases, when creating the first collection of content items, content management system 110 can encode in the first collection of content items an address of the second collection of content items. Moreover, in some examples, creating the first collection of content items can include linking the first collection of content items with the second collection of content items using an address associated with the second collection of content items.

At step 812, method 800 can include populating the first collection of content items with placeholders (e.g., 504) corresponding to content items (e.g., third-party content items) in the second collection of content items stored on third-party content management system 202. In some cases, the placeholders can have the addresses of the corresponding content items in the second collection of content items encoded in the placeholders. For example, each placeholder can be encoded with an address of a corresponding content item from the second collection of content items. Moreover, in some examples, the placeholders can represent the content items in the second collection of content items but do not include the actual data contents of the content items.

In some aspects, creating the first collection of content items and populating the first collection of content items with placeholders corresponding to content items in the second collection of content items can include identifying an address associated with the second collection of content items; based on the address, identifying a list of addresses corresponding to the content items in the second collection of content items; and creating a placeholder for each address in the list of addresses. Each placeholder can be encoded and/or associated with a respective address from the list of addresses.

When client device 150 tries to access a placeholder, client device 150 can use the encoded address to retrieve the data contents of the corresponding content item from third-party content management system 202. In some examples, when client device 150 tries to access a placeholder, client device 150 can be redirected to the content item on third-party content management system 202 associated with the address encoded in the placeholder.

At step 814, method 800 can include upon detecting, through the communication channel, a change to the second collection of content items stored on third-party content management system 202, automatically updating the first collection of content items to reflect the change. In some examples, the change can include one or more modifications to one or more content items in the second collection of content items, and automatically updating the first collection of content items can include automatically updating one or more placeholders on the first collection of content items to reflect the one or more modifications to the one or more content items in the second collection of content items.

The one or more placeholders can represent the one or more content items. In some examples, the one or more placeholders can be linked to the one or more content items via one or more addresses associated with the one or more content items. For example, the one or more placeholders can have the one or more addresses encoded in the one or more placeholders. The one or more placeholders can be linked to the one or more content items based on the one or more addresses encoded in the one or more placeholders.

In some examples, the change can include one or more modifications to the second collection of content items, and automatically updating the first collection of content items can include automatically updating the first collection of content items to reflect the one or more modifications to the second collection of content items. For example, the change can be a change to metadata associated with the second collection of content items, a change to an address of the second collection of content items, a removal of one or more content items in the second collection of content items, an addition of one or more content items to the second collection of content items, etc.

The first collection of content items can be automatically updated to reflect such change. For example, the first collection of content items can be automatically updated to reflect such change by modifying metadata associated with the first collection of content items based on the change to the metadata of the second collection of content items, modifying an addresses encoded on the first collection of content items based on the change to the address of the second collection of content items, removing a placeholder in the first collection of content items corresponding to the content item removed from the second collection of content items, adding a placeholder to the first collection of content items that corresponds to the content item added to the second collection of content items, etc.

In some cases, instead of, or in addition to, populating the first collection of content items with placeholders corresponding to content items in the second collection of content items stored on third-party content management system 202 as described in step 812, the method 800 can include storing copies of the actual content items in the second collection of content items stored on third-party content management system 202. For example, content management system 110 can create the first collection of content items and populate it with copies of the content items, including the data of the content items, in the second collection of content items stored on third-party content management system 202.

Moreover, in some cases, upon detecting, through the communication channel, a change to the second collection of content items (e.g., a change to the second collection, an addition of a content item to the second collection, a removal of a content item from the second collection, a modification to one or more content items in the second collection, etc.) stored on third-party content management system 202 as described in step 814, the method 800 can include automatically synchronizing the first collection of content items with the second collection of content items. Here, any content items added to, and/or removed from, the second collection of content items can similarly be added to, and/or removed from, the first collection of content items, and any modifications to any of the content items in the second collection can be synchronized with such copies of the content items stored in the first collection of content items so the contents of the first collection are synchronized with the contents of the second collection.

In some aspects, method 800 can further include providing, by content management system 110 using the communication channel, a second graphical user interface (e.g., 300 or 400) identifying one or more additional collections of content items stored on third-party content management system 202, and receiving, by content management system 110, a second request to create a third collection of content items based on a fourth collection of content items selected by user account 302 from the second graphical user interface. The fourth collection of content items can be a third-party collection stored on third-party content management system 202. Moreover, content management system 110 can create the third collection of content items in association with user account 302, populate the third collection of content items with respective placeholders corresponding to a plurality of content items in the fourth collection of content items stored on third-party content management system 202, and upon detecting, through the communication channel, a change to the second collection of content items stored on third-party content management system 202, automatically update the first collection of content items to reflect the change.

In some aspects, method 800 can further include receiving, by content management system 110, additional authentication information associated with a second third-party content management system (e.g., 204 or 206); based on the additional authentication information, establishing a second communication channel between content management system 110 and the second third-party content management system; providing, by content management system 110 using the second communication channel, a second graphical user interface (e.g., 300 or 400) identifying one or more additional collections of content items stored on the second third-party content management system; receiving, by content management system 110, a second request to create a third collection of content items based on a fourth collection of content items selected by user account 302 from the second graphical user interface; creating, by content management system 110, the third collection of content items in association with user account 302; and populating the third collection of content items with respective placeholders corresponding to a plurality of content items in the fourth collection of content items stored on the second third-party content management system. In some cases, method 800 can also include upon detecting, through the second communication channel, a change to the fourth collection of content items stored on the second third-party content management system, automatically updating the third collection of content items to reflect the change.

In this example, the fourth collection of content items can be a third-party collection stored on the second third-party content management system. Moreover, method 800 can include upon detecting, through the second communication channel, a respective change to the fourth collection of content items stored on the second third-party content management system, automatically updating the third collection of content items to reflect the respective change.

In some examples, method 800 can further include storing, by content management system 110, the first collection of content items within a storage object stored at content management system 110 in association with the user account, and associating each content item in the first collection of content items with an interface element (e.g., 540, 542) identifying that content item as being linked to a remote content item in the second collection. The storage object can contain one or more content items associated with the user account. Moreover, the storage object can include, for example, a directory, a folder, a namespace, or any other data structure for storing content items.

Figure 9:
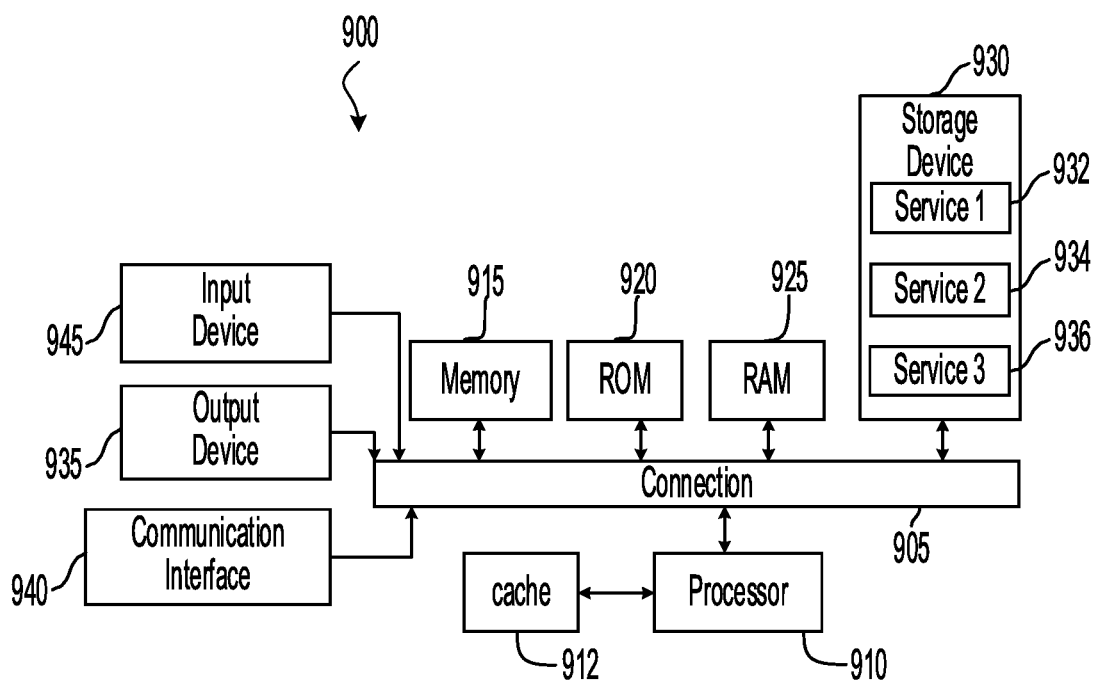
FIG. 9 shows an example system for implementing various aspects of the present technology, according to some examples.

FIG. 9 shows an example of computing system 900, which can be for example any computing device making up client device 150, content management system 110 or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some examples, computing system 900 is a distributed system in which the functions described in this disclosure can be distributed within a datacenter, multiple datacenters, a peer network, etc. In some examples, one or more of the described system components represents many such components each performing some or all of the function for which the component is described. In some examples, the components can be physical or virtual devices.

Example computing system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B. In other words, claim language reciting "at least one of A and B" means A and/or B.

What is claimed is:

1. A method comprising:
    receiving, by a first content management system (CMS) from a client device associated with a user account on the first CMS, authentication information of another user account associated with a third-party CMS, wherein the first CMS is configured to synchronize content items between at least the client device and the first CMS using the user account of the first CMS and the third-party CMS is configured to synchronize content items between at least the client device and the third-party CMS using the another user account associated with the third-party CMS;
    based on the authentication information, establishing, by the first CMS, a communication channel to the third-party CMS, and determining, by the first CMS, one or more collections of content items stored on the third-party CMS;
    sending, by the first CMS to the client device, information identifying the one or more collections being stored on the third-party CMS;
    receiving, by the first CMS from the client device, a request to create a first collection of content items based on a second collection of content items selected from the information identifying the one or more collections of content items stored on the third-party CMS;
    creating, by the first CMS, the first collection of content items in association with the user account;
    populating the first collection of content items with placeholders corresponding to content items in the second collection of content items stored on the third-party CMS; and
    upon detecting, through the communication channel, a change to the second collection of content items stored on the third-party CMS, automatically updating the first collection of content items to reflect the change.

2. The method of claim 1, further comprising:
    using the communication channel, providing, by the first CMS, a second graphical user interface identifying one or more additional collections of content items stored on the third-party CMS;
    receiving, by the first CMS, a second request to create a third collection of content items based on a fourth collection of content items selected by the user account from the second graphical user interface, the fourth collection of content items being stored on the third-party CMS;
    creating, by the first CMS, the third collection of content items in association with the user account;
    populating the third collection of content items with respective placeholders corresponding to a plurality of content items in the fourth collection of content items stored on the third-party CMS; and
    upon detecting, through the communication channel, a second change to the fourth collection of content items stored on the third-party CMS, automatically updating the second collection of content items to reflect the second change.

3. The method of claim 1, further comprising:
    receiving, by the first CMS, additional authentication information associated with a third CMS;
    based on the additional authentication information, establishing a second communication channel between the first CMS and the third CMS;
    using the second communication channel, providing, by the first CMS, a second graphical user interface identifying one or more additional collections of content items stored on the third CMS;
    receiving, by the first CMS, a second request to create a third collection of content items based on a fourth collection of content items selected by the user account from the second graphical user interface, the fourth collection of content items being stored on the third CMS;
    creating, by the first CMS, the third collection of content items in association with the user account;
    populating the third collection of content items with respective placeholders corresponding to a plurality of content items in the fourth collection of content items stored on the third CMS; and
    upon detecting, through the second communication channel, a second change to the fourth collection of content items stored on the third CMS, automatically updating the third collection of content items to reflect the second change.

4. The method of claim 1, wherein the communication channel comprises at least one of an application programming interface (API) connection and a network connection established using one or more networking protocols, the method further comprising:
    storing, by the first CMS, the first collection of content items within a storage object stored at the first CMS in association with the user account, wherein the storage object contains one or more content items associated with the user account and wherein the storage object comprises at least one of a directory, a folder, an a namespace; and
    associating each content item in the first collection of content items with an interface element identifying that the content item as being linked to a remote content item in the second collection.

5. The method of claim 1, wherein the change comprises one or more modifications associated with one or more content items in the second collection of content items, and wherein automatically updating the first collection of content items comprises automatically updating one or more placeholders on the first collection of content items to reflect the one or more modifications associated with the one or more content items in the second collection of content items, the one or more placeholders representing the one or more content items.

6. The method of claim 5, wherein the one or more placeholders are linked to the one or more content items via one or more addresses associated with the one or more content items, the one or more placeholders having the one or more addresses encoded in the one or more placeholders.

7. The method of claim 1, wherein creating the first collection of content items comprises linking the first collection of content items with the second collection of content items using an address associated with the second collection of content items.

8. The method of claim 1, wherein creating the first collection of content items and populating the first collection of content items with placeholders corresponding to content items in the second collection of content items comprises:
    identifying an address associated with the second collection of content items;
    based on the address, identifying a list of addresses corresponding to the content items in the second collection of content items; and
    creating a placeholder for each address in the list of addresses, each placeholder being encoded with a respective address from the list of addresses.

9. The method of claim 1, wherein the first collection and the second collection are one of a folder, a directory, a digital content album, an online media channel of media content, or a web feed.

10. A system comprising:
one or more processors; and
at least one non-transitory computer-readable medium having stored therein instructions which, when executed by the one or more processors, cause the one or more processors to:
receive, by a first content management system (CMS) from a client device associated with a user account on the first CMS, authentication information associated with a third-party CMS, wherein the first CMS is configured to synchronize content items between at least the client device and the first CMS using the user account of the first CMS and the third-party CMS is configured to synchronize content items between at least the client device and the third-party CMS using the another user account associated with the third-party CMS;
based on the authentication information, establish, by the first CMS, a communication channel to the third-party CMS, and determine, by the first CMS, one or more collections of content items stored on the third-party CMS;
send, by the first CMS to the client device, information identifying the one or more collections being stored on the third-party CMS;
receive, by the first CMS from the client device, a request to create a first collection of content items based on a second collection of content items selected from the information identifying the one or more collections of content items stored on the third-party CMS;
create, by the first CMS, the first collection of content items in association with the user account;
populate the first collection of content items with placeholders corresponding to content items in the second collection of content items stored on the third-party CMS; and
upon detecting, through the communication channel, a change to the second collection of content items stored on the third-party CMS, automatically update the first collection of content items to reflect the change.

11. The system of claim 10, wherein the at least one non-transitory computer-readable medium stores instructions which, when executed by the one or more processors, cause the one or more processors to:
using the communication channel, provide, by the first CMS, a second graphical user interface identifying one or more additional collections of content items stored on the third-party CMS;
receive, by the first CMS, a second request to create a third collection of content items based on a fourth collection of content items selected by the user account from the second graphical user interface, the fourth collection of content items being stored on the third-party CMS;
create, by the first CMS, the third collection of content items in association with the user account;
populate the third collection of content items with respective placeholders corresponding to a plurality of content items in the fourth collection of content items stored on the third-party CMS; and
upon detecting, through the communication channel, a change to the second collection of content items stored on the third-party CMS, automatically update the first collection of content items to reflect the change.

12. The system of claim 10, wherein the second collection comprises at least one of a folder, a directory, a digital content album, an online media channel of media content, or a web feed.

13. The system of claim 10, wherein the at least one non-transitory computer-readable medium stores instructions which, when executed by the one or more processors, cause the one or more processors to:
receive, by the first CMS, additional authentication information associated with a third CMS;
based on the additional authentication information, establish a second communication channel between the first CMS and the third CMS;
using the second communication channel, provide, by the first CMS, a second graphical user interface identifying one or more additional collections of content items stored on the third CMS;
receive, by the first CMS, a second request to create a third collection of content items based on a fourth collection of content items selected by the user account from the second graphical user interface, the fourth collection of content items being stored on the third CMS;
create, by the first CMS, the third collection of content items in association with the user account;
populate the third collection of content items with respective placeholders corresponding to a plurality of content items in the fourth collection of content items stored on the third CMS; and
upon detecting, through the second communication channel, a second change to the fourth collection of content items stored on the third CMS, automatically update the third collection of content items to reflect the second change.

14. The system of claim 13, wherein the at least one non-transitory computer-readable medium stores instructions which, when executed by the one or more processors, cause the one or more processors to:
upon detecting, through the second communication channel, a respective change to the fourth collection of content items stored on the third CMS, automatically update the third collection of content items to reflect the respective change.

15. The system of claim 10, wherein the change comprises one or more modifications associated with one or more content items in the second collection of content items, and wherein automatically updating the first collection of content items comprises automatically updating one or more placeholders on the first collection of content items to reflect the one or more modifications associated with the one or more content items in the second collection of content items, the one or more placeholders representing the one or more content items.

16. The system of claim 15, wherein the one or more placeholders are linked to the one or more content items via one or more addresses associated with the one or more content items, the one or more placeholders having the one or more addresses encoded in the one or more placeholders.

17. The system of claim 10, wherein creating the first collection of content items and populating the first collection of content items with placeholders corresponding to content items in the second collection of content items comprises:

identifying an address associated with the second collection of content items;

based on the address, identifying a list of addresses corresponding to the content items in the second collection of content items; and creating a placeholder for each address in the list of addresses, each placeholder being encoded with a respective address from the list of addresses.

18. A non-transitory computer-readable medium comprising instructions that, when executed by one or more processors, cause the one or more processors to:

receive, by a client device associated with a user account on a first content management system (CMS), authentication information of another user account associated with a third-party CMS, wherein the first CMS is configured to synchronize content items between at least the client device and the first CMS using the user account of the first CMS and the third-party CMS is configured to synchronize content items between at least the client device and the third-party CMS using the another user account associated with the third-party CMS;

send, by the client device to the first CMS, the information identifying one or more collections being stored on the third-party CMS;

based on the authentication information, establish, by the client device, a communication channel to the third-party CMS, and determine one or more collections of content items stored on the third-party CMS;

receive a request to create a first collection of content items based on a second collection of content items selected from the information identifying the one or more collections of content items stored on the third-party CMS;

create and store the first collection of content items in association with the user account on the first CMS;

populate the first collection of content items with placeholders corresponding to content items in the second collection of content items stored on the third-party CMS; and upon detecting, through the communication channel, a change to the second collection of content items stored on the third-party CMS, automatically update the first collection of content items to reflect the change.

19. The non-transitory computer-readable medium of claim 18, storing instructions that, when executed by the one or more processors, cause the one or more processors to:

using the communication channel, provide a second graphical user interface identifying one or more additional collections of content items stored on the third-party CMS;

receive a second request to create a third collection of content items based on a fourth collection of content items selected by the user account from the second graphical user interface, the fourth collection of content items being stored on the third-party CMS;

create and store the third collection of content items in association with the user account;

populate the third collection of content items with respective placeholders corresponding to a plurality of content items in the fourth collection of content items stored on the third-party CMS; and upon detecting, through the communication channel, a change to the second collection of content items stored on the third-party CMS, automatically update the first collection of content items to reflect the change.

20. The non-transitory computer-readable medium of claim 18, storing instructions that, when executed by the one or more processors, cause the one or more processors to:

receive additional authentication information associated with a third CMS;

based on the additional authentication information, establish a second communication channel between the client device and the third CMS;

using the second communication channel, provide a second graphical user interface identifying one or more additional collections of content items stored on the third CMS;

receive a second request to create a third collection of content items based on a fourth collection of content items selected by the user account from the second graphical user interface, the fourth collection of content items being stored on the third CMS;

create the third collection of content items in association with the user account;

populate the third collection of content items with respective placeholders corresponding to a plurality of content items in the fourth collection of content items stored on the third CMS; and upon detecting, through the second communication channel, a respective change to the fourth collection of content items stored on the third CMS, automatically update the third collection of content items to reflect the respective change.

* * * * *